(12) United States Patent
Miao et al.

(10) Patent No.: US 9,473,938 B2
(45) Date of Patent: Oct. 18, 2016

(54) CONTENT SHARING METHOD, APPARATUS, AND SYSTEM

(71) Applicant: Huawei Technologies Co., Ltd., Shenzhen (CN)

(72) Inventors: Chuanjie Miao, Shenzhen (CN); Zhandong Wang, Shenzhen (CN); Jingyu Lai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/584,955

(22) Filed: Dec. 29, 2014

(65) Prior Publication Data
US 2015/0119000 A1  Apr. 30, 2015

Related U.S. Application Data

(63) Continuation of application No. PCT/CN2014/081938, filed on Jul. 10, 2014.

(30) Foreign Application Priority Data

Aug. 20, 2013 (CN) .......................... 2013 1 0364476

(51) Int. Cl.
*H04M 3/16* (2006.01)
*H04W 12/06* (2009.01)
(Continued)

(52) U.S. Cl.
CPC .............. *H04W 12/06* (2013.01); *G06F 21/10* (2013.01); *G06F 21/6218* (2013.01);
(Continued)

(58) Field of Classification Search
CPC .... G06F 21/10; G06F 21/6218; G06F 29/06; G06F 63/0492; G06F 63/10; G06F 63/18; H04N 21/4367; H04W 12/06; H04W 12/08; H04W 76/022

USPC ....... 455/411–414.2, 418–420, 456.1, 456.3, 455/457, 41.1–41.3; 726/4, 5, 9
See application file for complete search history.

(56) References Cited

U.S. PATENT DOCUMENTS

2012/0042363 A1* 2/2012 Moosavi ............... H04L 9/3228 726/5
2012/0102566 A1* 4/2012 Vrancken .............. G06F 21/335 726/20

FOREIGN PATENT DOCUMENTS

| CN | 101247338 A | 8/2008 |
|---|---|---|
| CN | 102347957 A | 2/2012 |

(Continued)

*Primary Examiner* — Babar Sarwar
(74) *Attorney, Agent, or Firm* — Slater Matsil, LLP

(57) ABSTRACT

The present invention discloses a server receives an access request sent by an information requesting terminal, where the access request carries information about a shared resource that the information requesting terminal requests to access; the server periodically sends a first authentication identifier to the information requesting terminal; the information requesting terminal sends the first authentication identifier to an information management terminal according to the received first authentication identifier; the information management terminal sends a second authentication identifier to the server; the server determines, whether the first authentication identifier sent to the information requesting terminal matches the second authentication identifier; if the first authentication identifier sent to the information requesting terminal matches the second authentication identifier, the server determines access permission of the information requesting terminal. According to the technical solutions provided in the present invention, access by an information requesting terminal is confirmed periodically, thereby implementing secure privacy protection.

13 Claims, 10 Drawing Sheets

(51) Int. Cl.
*H04W 76/02* (2009.01)
*G06F 21/10* (2013.01)
*G06F 21/62* (2013.01)
*H04L 29/06* (2006.01)
*H04W 12/08* (2009.01)
*H04N 21/4367* (2011.01)

(52) U.S. Cl.
CPC ......... *H04L 63/10* (2013.01); *H04N 21/4367* (2013.01); *H04W 12/08* (2013.01); *H04W 76/022* (2013.01); *H04L 63/0492* (2013.01); *H04L 63/18* (2013.01)

(56) References Cited

FOREIGN PATENT DOCUMENTS

| | | |
|---|---|---|
| CN | 102377769 A | 3/2012 |
| CN | 102449976 A | 5/2012 |
| CN | 103391197 A | 11/2013 |
| CN | 103441997 A | 12/2013 |
| EP | 1363424 A2 | 11/2003 |
| EP | 2257026 A1 | 12/2010 |
| EP | 2421217 A1 | 2/2012 |

* cited by examiner

CONTENT SHARING METHOD, APPARATUS, AND SYSTEM

This application is a continuation of International Application No. PCT/CN2014/081938, filed on Jul. 10, 2014, which claims priority to Chinese Patent Application No. 201310364476.9, filed on Aug. 20, 2013, both of which are hereby incorporated by reference in their entireties.

TECHNICAL FIELD

The present invention relates to the field of information security, and more specifically, to a content sharing method, apparatus, and system.

BACKGROUND

Because storage space and a computing capability of a mobile terminal are limited, cloud computing and cloud storage technologies are used to improve an application capability of the mobile terminal. Moreover, mobility of the mobile terminal is used to enable a cloud service to be really available at any time and in any place. Under this trend, a cloud server is a real place of storing personal information, and the mobile terminal becomes, due to its convenience, an agent of cloud information. In addition, due to binding of the mobile terminal and an individual, the mobile terminal also becomes a key for accessing cloud information.

With the development of a big data technology and a context awareness technology, interaction among multiple terminals is increasing. However, because personalized data of a terminal is mainly stored on a server, a mobile terminal is required to provide authorization and authentication information for another terminal, so that the another terminal can access personalized data of the server. Likewise, a manner used for sharing information among terminals is also changed from an original end-to-end manner to a manner of using a server to perform transfer, which also requires a mobile terminal to provide authorization and authentication information for another terminal.

At present, in an end-to-end communication manner, an information management terminal sends an address of shared content stored by the information management terminal on a server to an information requesting terminal, so that the information requesting terminal can access information of a cloud end at the cloud end all the time. In this case, because the information requesting terminal gets authorization all the time, the cloud end opens permission of accessing shared information to the information requesting terminal all the time, which causes security and privacy protection problems. Therefore, a secure and reliable authorization method is required.

SUMMARY

The present invention provides a content sharing method, apparatus, and system, which aim to resolve security and privacy protection problems when shared content is accessed.

To achieve the preceding objectives, the following technical solutions are adopted in embodiments of the present invention.

In accordance with an embodiment, a content sharing method is provided. In this example, the method comprises receiving an access request sent by an information requesting terminal. The access request carries information about a shared resource that the information requesting terminal is requesting to access. The method further includes periodically sending a first authentication identifier to the information requesting terminal according to the received access request. The information requesting terminal sends the first authentication identifier to an information management terminal. The method further includes receiving a second authentication identifier from the information management terminal, determining whether the first authentication identifier matches the second authentication identifier, and granting access permission to the information requesting terminal when the first authentication identifier matches the second authentication identifier. An apparatus for performing this method is also provided.

In accordance with another embodiment, an authorization method is provided. In this example, the method comprises periodically sending an authorization request from an information management terminal to a server. The authorization request requests that the server determine access permission of an information requesting terminal. The method further includes receiving a first authentication identifier from the server, sending the first authentication identifier to the information requesting terminal, and sending a second authentication identifier to the server. The server is adapted to grant access permission to the information requesting terminal when the first authentication identifier matches the second authentication identifier. An apparatus for performing this method is also provided.

According to a first aspect, the present invention provides a content sharing method, including: receiving, by a server, an access request sent by an information requesting terminal, where the access request carries information of a shared resource that the information requesting terminal requests to access; periodically sending, by the server, a first authentication identifier to the information requesting terminal according to the received access request; sending, by the information requesting terminal, the first authentication identifier to an information management terminal according to the received first authentication identifier; sending, by the information management terminal, a second authentication identifier to the server; determining, by the server according to the received second authentication identifier, whether the first authentication identifier sent to the information requesting terminal matches the second authentication identifier; and if the first authentication identifier sent to the information requesting terminal matches the second authentication identifier, determining, by the server, access permission of the information requesting terminal.

In a first possible implementation manner of the first aspect, the periodically sending a first authentication identifier to the information requesting terminal is specifically: sending, by the server and triggered by a timer, the first authentication identifier to the information requesting terminal according to the received access request.

With reference to the first aspect or the first possible implementation manner of the first aspect, in a second possible implementation manner of the first aspect, the periodically sending a first authentication identifier to the information requesting terminal is specifically: periodically sending, by the server, the first authentication identifier to the information requesting terminal according to the received access request and a preset time period.

With reference to the first aspect and any one of the foregoing possible implementation manners, in a third possible implementation manner of the first aspect, the method further includes: monitoring, by the information management terminal, connection status of the information management terminal and the information requesting terminal by using a heartbeat mechanism; and if the communication connection is disconnected, sending, by the information management terminal, a sharing termination instruction to the server, where the sharing termination instruction is used for enabling the server to terminate authorization for access performed by the information requesting terminal.

According to a second aspect, a content sharing method includes: receiving, by a server, an authorization request periodically sent by an information management terminal, where the authorization request is used for requesting the server to determine access permission of an information requesting terminal; sending, by the server, a first authentication identifier to the information management terminal according to the received authorization request; sending, by the information management terminal, the first authentication identifier to the information requesting terminal according to the received first authentication identifier; sending, by the information requesting terminal, a second authentication identifier to the server; determining, by the server according to the received second authentication identifier, whether the first authentication identifier sent to the information management terminal matches the second authentication identifier; and if the first authentication identifier sent to the information management terminal matches the second authentication identifier, determining, by the server, the access permission of the information requesting terminal.

In a first possible implementation manner of the second aspect, the receiving, by a server, an authorization request periodically sent by an information management terminal is specifically: periodically sending, by the information management terminal and triggered by a timer, the authorization request to the server.

In a second possible implementation manner of the second aspect, the receiving, by a server, an authorization request periodically sent by an information management terminal is specifically: periodically sending, by the information management terminal, the authorization request to the server according to a preset time period.

With reference to the second aspect and any one of the foregoing possible implementation manners, the method further includes: monitoring, by the information management terminal, connection status of the information management terminal and the information requesting terminal by using a heartbeat mechanism; and if the communication connection is disconnected, sending, by the information management terminal, a sharing termination instruction to the server, where the sharing termination instruction is used for enabling the server to terminate authorization for access performed by the information requesting terminal.

According to a third aspect, an apparatus for accessing shared content is provided, where the apparatus includes: a content accessing unit and a terminal interacting unit; the content accessing unit is configured to send an access request to a server, where the access request carries information about a shared resource requested to be accessed, and receive a first authentication identifier periodically sent by the server; and the terminal interacting unit is configured to send the first authentication identifier to an information management terminal, so that the information management terminal requests, according to the first authentication identifier, the server to perform authentication and determine access permission to enable the content accessing unit to access the shared resource information.

According to a fourth aspect, a content sharing server is provided, where the server includes: an interacting unit and a determining unit; the interacting unit is configured to receive an access request sent by an information requesting terminal, where the access request carries information about a shared resource that the information requesting terminal requests to access, periodically send a first authentication identifier to the information requesting terminal according to the received access request, and receive a second authentication identifier sent by an information management terminal; and the determining unit is configured to determine, according to the received second authentication identifier, whether the first authentication identifier sent to the information requesting terminal matches the second authentication identifier, and if the first authentication identifier sent to the information requesting terminal matches the second authentication identifier, determine access permission of the information requesting terminal.

In a first possible implementation manner of the fourth aspect, the apparatus further includes a timer, where the timer is configured to trigger, at regular time according to the received access request, the periodic sending of the first authentication identifier to the information requesting terminal; and the interacting unit is configured to periodically send the first authentication identifier to the information requesting terminal according to the triggering by the timer.

In a second possible implementation manner of the fourth aspect, the apparatus further includes a setting unit, where the setting unit is configured to set a preset time period; and the interacting unit is configured to periodically send the first authentication identifier to the information requesting terminal according to the received access request and the preset time period.

According to a fifth aspect, an authorization apparatus is provided, where the apparatus includes: a server interacting unit and a terminal interacting unit; the server interacting unit is configured to periodically send an authorization request to a server, where the authorization request is used for requesting the server to determine access permission of an information requesting terminal; the terminal interacting unit is configured to receive a first authentication identifier sent by the information management terminal, where the first authentication identifier is sent to an information management terminal by the server according to the authorization request; and the server interacting unit is further configured to send a second authentication identifier to the server according to the first authentication identifier, so that the server determines the access permission of the information requesting terminal according to the second authentication identifier.

In a first possible implementation manner of the fifth aspect, the apparatus further includes: a timer, where the timer is configured to trigger the periodic sending of the authorization request to the server at regular time; and the server interacting unit is configured to periodically send the authorization request to the server according to the triggering by the timer.

In a second possible implementation manner of the fifth aspect, the apparatus further includes: a setting unit, where the setting unit is configured to set a preset time period; and the server interacting unit is further configured to periodically send the authorization request to the server according to the preset time period.

With reference to the fifth aspect and any one of the foregoing possible implementation manners, in a third possible implementation manner, the apparatus further includes: a monitoring unit, where the monitoring unit is configured to monitor connection status of the information management terminal and the information requesting terminal by using a heartbeat mechanism; and the server interacting unit is further configured to: if the monitoring unit monitors that the communication connection is disconnected, send a sharing termination instruction to the server, where the sharing termination instruction is used for enabling the server to terminate authorization for access performed by the information requesting terminal.

According to a sixth aspect, a content sharing server is provided, where the apparatus includes: an interacting unit and a determining unit; the interacting unit is configured to receive an authorization request periodically sent by an information management terminal, where the authorization request is used for requesting to determine access permission of an information requesting terminal, and according to the received authorization request, send a first authentication identifier to the information management terminal and receive a second authentication identifier sent by the information requesting terminal according to the first authentication identifier; and the determining unit is configured to determine, according to the received second authentication identifier, whether the first authentication identifier sent to the information management terminal matches the second authentication identifier, and if the first authentication identifier sent to the information management terminal matches the second authentication identifier, determine the access permission of the information requesting terminal.

According to a seventh aspect, a content sharing system is provided, where the system includes: an information management terminal, a server, and an information requesting terminal; the information requesting terminal is configured to send an access request to the server, where the access request carries information about a shared resource that the information requesting terminal requests to access, receive a first authentication identifier sent by the server, and send the first authentication identifier to the information management terminal according to the received first authentication identifier; the information management terminal is configured to receive the first authentication identifier sent by the information management terminal and send a second authentication identifier to the server; and the server is configured to receive the access request sent by the information requesting terminal, where the access request carries the information about the shared resource that the information requesting terminal requests to access, periodically send the first authentication identifier to the information requesting terminal according to the received access request, determine, according to the received second authentication identifier sent by the information management terminal, whether the first authentication identifier sent to the information requesting terminal matches the second authentication identifier, and if the first authentication identifier sent to the information requesting terminal matches the second authentication identifier, determine access permission of the information requesting terminal.

In a first possible implementation manner of the seventh aspect, the server is further configured to periodically send the first authentication identifier to the information requesting terminal according to triggering by a timer.

In a second possible implementation manner of the seventh aspect, the server is further configured to periodically send the first authentication identifier to the information requesting terminal according to the received access request and a preset time period.

With reference to the seventh aspect and any one of the foregoing possible implementation manners, the information management terminal is further configured to monitor connection status of the information management terminal and the information requesting terminal by using a heartbeat mechanism; and if the communication connection is disconnected, send a sharing termination instruction to the server, where the sharing termination instruction is used for enabling the server to terminate authorization for access performed by the information requesting terminal.

According to an eighth aspect, a content sharing system is provided, where the system includes: an information management terminal, a server, and an information requesting terminal; the information management terminal is configured to periodically send an authorization request to the server, where the authorization request is used for requesting the server to determine access permission of the information requesting terminal, and receive a first authentication identifier sent by the server; the information requesting terminal is configured to receive the first authentication identifier sent by the information management terminal and send a second authentication identifier to the server; and the server is configured to receive the authorization request periodically sent by the information management terminal, where the authorization request is used for requesting the server to determine the access permission of the information requesting terminal, send the first authentication identifier to the information management terminal according to the received authorization request, receive the second authentication identifier sent by the information requesting terminal, determine, according to the received second authentication identifier, whether the first authentication identifier matches the second authentication identifier, and if the first authentication identifier matches the second authentication identifier, determine the access permission of the information requesting terminal.

In a first possible implementation manner of the eighth aspect, the information management terminal is further configured to periodically send the authorization request to the server according to triggering by a timer.

In a second possible implementation manner of the eighth aspect, the information management terminal is further configured to periodically send the authorization request to the server according to a preset time period.

With reference to the eighth aspect and any one of the foregoing possible implementation manners of the eighth aspect, the information management terminal is further configured to monitor connection status of the information management terminal and the information requesting terminal by using a heartbeat mechanism; and if the communication connection is disconnected, send a sharing termination instruction to the server, where the sharing termination instruction is used for enabling the server to terminate authorization for access performed by the information requesting terminal.

In the present invention, an information management terminal requests a server to periodically perform authentication on access permission of an information requesting terminal, or an information requesting terminal requests access permission from a server and the server periodically performs authentication on access permission of the information requesting terminal. According to the technical solutions provided in the present invention, when authorization is performed, a server periodically performs authentication on access permission of an information requesting terminal, which implements periodic confirmation of access performed by the information requesting terminal, thereby implementing secure privacy protection. Meanwhile, an information management terminal is only responsible for performing authorization and authentication on access to shared content. Actual shared content is directly sent from the server to the information requesting terminal and does not need to be forwarded by the information management terminal, which decreases traffic of the information management terminal and saves electric power.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
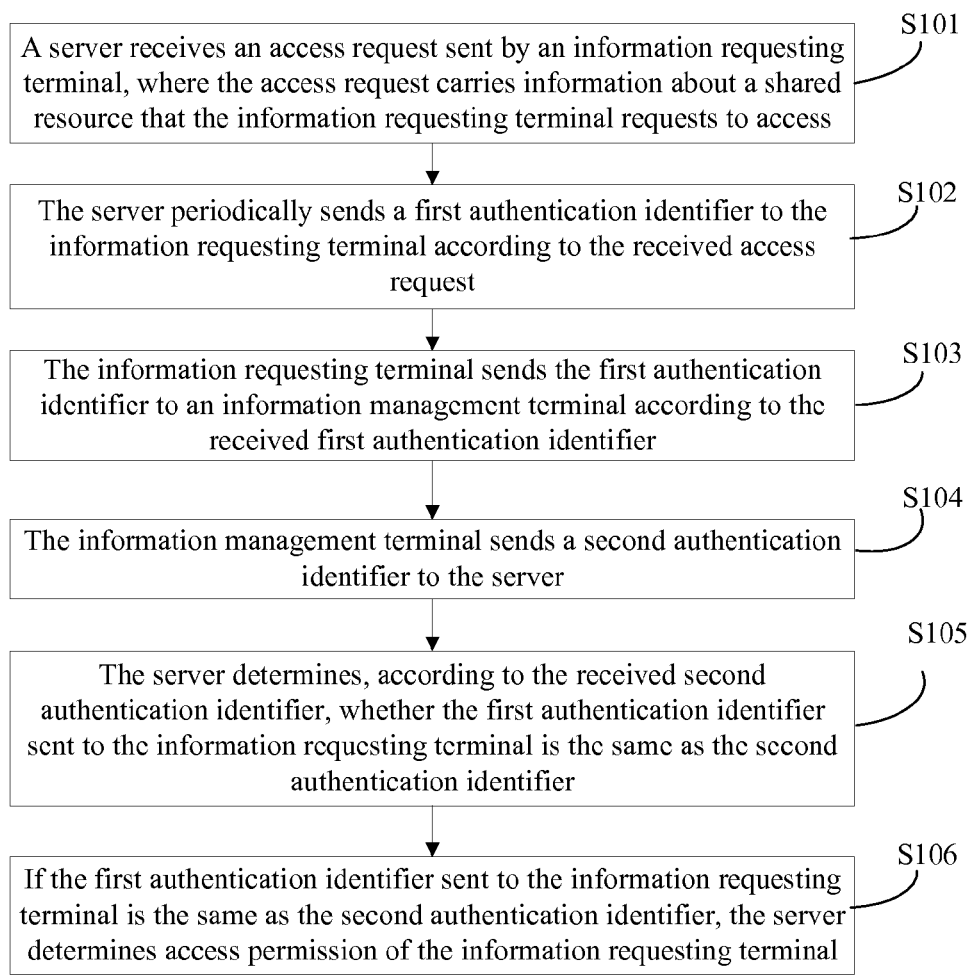
FIG. 1 is a flowchart of a content sharing method according to an embodiment of the present invention.

FIG. 1 is a flowchart of a content sharing method according to an embodiment of the present invention. As shown in FIG. 1, in order to enable an information management terminal to conveniently and securely authorize another terminal to access content that is used for sharing and stored on a server by the information management terminal, this embodiment of the present invention provides a content sharing method. An information management terminal is a terminal used for information management, and is configured to provide shared content and store the shared content on a server. An information requesting terminal is a terminal that requests to access the shared content that is stored on the server.

An implementation process of this embodiment of the present invention, as shown in FIG. 1, specifically includes the following:

S101: A server receives an access request sent by an information requesting terminal, where the access request carries information about a shared resource that the information requesting terminal requests to access.

In this embodiment of the present information, the information about the shared resource may include a list of authorized resources and an identifier of shared information. The list of authorized resources lists content that can be shared and is provided by an information management terminal, and may be but is not limited to a form of a table that lists some or all of content that the information management terminal provides for sharing. The identifier of shared information is used for identifying or locating shared content listed in a list of authorized resources, and specifically may be but is not limited to information that can be used for identifying or locating the shared content, for example, a uniform resource locator (Uniform Resource Locator, URL) and a uniform resource identifier (Uniform Resource Identifier, URI).

After receiving the information about the shared resource, the information requesting terminal may further send, according to content included in the information about the shared resource, for example, any one or a combination of the list of authorized resources, the identifier of shared information, and an authorization level, the access request to the server to trigger the server to deliver an authentication identifier.

S102: The server periodically sends a first authentication identifier to the information requesting terminal according to the received access request.

Therefore, the server determines access permission of the information requesting terminal according to the received access request.

The server may include a timer, and sends, according to the received access request and triggered by the timer, the first authentication identifier to the information requesting terminal.

The server may include a setting unit, and periodically sends the first authentication identifier to the information requesting terminal according to a preset time period.

The first authentication identifier is used by the server to authorize the information requesting terminal to access the shared content, and may be but is not limited to a generated string of digit or symbol sequences, or a string of sequences selected or intercepted from an existing digit or symbol sequence set.

The server periodically sends the first authentication identifier to the information requesting terminal, so as to ensure the access permission of the information requesting terminal, thereby implementing secure and personalized authorization.

S103: The information requesting terminal sends the first authentication identifier to an information management terminal according to the received first authentication identifier.

The information requesting terminal and the information management terminal may perform communication by means of near field communication. The following provides description by using the near field communication as an example. A near field communication system may be but is not limited to all types of wireless communications systems of a wireless local area network or a wireless personal area network, for example, wireless fidelity (Wireless Fidelity, Wi-Fi), Bluetooth (Bluetooth), and near field communication (Near Field Communication, NFC).

The information management terminal establishes a communication connection with the information requesting terminal by using the near field communication system. The information management terminal and the information requesting terminal may perform communication within a close range. Meanwhile, when a distance between the information management terminal and the information requesting terminal increases, the near field communication system cannot perform normal communication because the distance is too far, thereby disconnecting the communication connection.

After the information management terminal establishes the communication connection with the information requesting terminal by using the near field communication system, the communication connection still needs to be kept. When the communication connection is in a connected state, the information requesting terminal can be authorized to access the shared content. When the communication connection is in a disconnected state, the access permission of the information requesting terminal for the shared content is terminated.

Optionally, the information management terminal may monitor connection status of the communication connection by using a heartbeat mechanism. The heartbeat mechanism may continuously check the connection status by means of periodically sending a data packet and obtaining an acknowledgement. If the communication connection is disconnected, the information management terminal sends a sharing termination instruction to the server, where the sharing termination instruction is used for enabling the server to terminate the access permission of the information requesting terminal.

Specially, a method used by the information requesting terminal to send the first authentication identifier to the information management terminal may be sending information by using the communication connection established by the near field communication system, or may also be sending information by using a communication connection established by another communications system, where the another communications system may include but is not limited to a near field communication system and also includes multiple types of wireless communications systems such as a Global System for Mobile Communications (GSM), a Wideband Code Division Multiple Access (WCDMA) system, Time Division-Synchronous Code Division Multiple Access (TD-SCDMA), a Worldwide Interoperability for Microwave Access (WiMax) system, and a long term evolution (LTE) system.

S104: The information management terminal sends a second authentication identifier to the server.

The second authentication identifier includes but is not limited to a generated string of digit or symbol sequences, or a string of sequences selected or intercepted from an existing digit or symbol sequence set.

The information requesting terminal and the information management terminal may perform communication by means of near field communication. The following provides description by using the near field communication as an example. A near field communication system may be but is not limited to all types of wireless communications systems of a wireless local area network or a wireless personal area network, for example, wireless fidelity (Wireless Fidelity, Wi-Fi), Bluetooth (Bluetooth), and near field communication (Near Field Communication, NFC).

The information management terminal establishes a communication connection with the information requesting terminal by using the near field communication system. The information management terminal and the information requesting terminal may perform communication within a close range. Meanwhile, when a distance between the information management terminal and the information requesting terminal increases, the near field communication system cannot perform normal communication because the distance is too far, thereby disconnecting the communication connection.

After the information management terminal establishes the communication connection with the information requesting terminal by using the near field communication system, the communication connection still needs to be kept. When the communication connection is in a connected state, the information requesting terminal can be authorized to access the shared content When the communication connection is in a disconnected state, access permission of the information requesting terminal for the shared content is terminated.

Optionally, the information management terminal may monitor connection status of the communication connection by using a heartbeat mechanism. The heartbeat mechanism may continuously check the connection status by means of periodically sending a data packet and obtaining an acknowledgement. If the communication connection is disconnected, the information management terminal sends a sharing termination instruction to the server, where the sharing termination instruction is used for enabling the server to terminate the access permission of the information requesting terminal.

Specially, a method used by the information management terminal to send the second authentication identifier to the server may be sending information by using the communication connection established by the near field communication system, or may also be sending information by using a communication connection established by another communications system, where the another communications system may include but is not limited to a near field communication system and also includes multiple types of wireless communications systems such as a Global System for Mobile communications (GSM), a Wideband Code Division Multiple Access (WCDMA) system, Time Division-Synchronous Code Division Multiple Access (TD-SCDMA), Worldwide Interoperability for Microwave Access (WiMax), and long term evolution (LTE).

In another embodiment of the present invention, an encryption algorithm is negotiated between the information management terminal and the server, so as to enhance security of performing authorization on the shared content, where the encryption algorithm may use symmetric encryption, or may also use asymmetric encryption. When the symmetric encryption is used, the encryption algorithm includes but is not limited to DES, IDEA, RC2, RC4, SKIPJACK, RC5, AES, and the like. When the asymmetric encryption is used, the encryption algorithm includes but is not limited to RSA, Elgamal, a knapsack algorithm, Rabin, D-H, ECC, and the like.

A method for negotiating an encryption algorithm between the information management terminal and the server may be: the information management terminal sends a list of available encryption algorithms to the server according to an encryption algorithm supported by the information management terminal, and the server selects and determines an encryption algorithm to be used from the list, and notifies the information management terminal.

A method for negotiating an encryption algorithm between the information management terminal and the server may also be: the server selects all available encryption algorithms and sends a list of available encryption algorithms to the information management terminal, and the information management terminal selects and determines an encryption algorithm to be used from the list, and notifies the server.

After the encryption algorithm is negotiated, the information management terminal uses the encryption algorithm determined by the server or the information management terminal to encrypt the received authentication identifier, generates an encrypted second authentication identifier, and sends the encrypted second authentication identifier to the server.

Optionally, the information management terminal may send an authorization level to the server. The authorization level represents permission of the information requesting terminal to perform an operation on the shared content, and may include but is not limited to operations of different levels such as "read only", "duplicatable", "savable", and "modifiable", or a combination of these operations.

Optionally, the information management terminal may send an authorization time limit to the server. The authorization time limit indicates an effective time limit for the information management terminal to perform authorization on the shared content listed in the list of authorized resources. All authorization information is valid only within a term specified by the authorization time limit and is automatically invalidated beyond the authorization time limit.

S105: The server determines, according to the received second authentication identifier, whether the first authentication identifier sent to the information requesting terminal matches the second authentication identifier.

The server determines, according to the received second authentication identifier that is sent by the information management terminal, whether the first authentication identifier sent to the information requesting terminal matches the second authentication identifier.

In another embodiment of the present invention, if the received second authentication identifier is encrypted, the server decrypts the received second authentication identifier according to a decryption algorithm corresponding to the previously negotiated encryption algorithm, and compares the decrypted second authentication identifier and the first authentication identifier that the server sends to the information requesting terminal to determine whether the decrypted second authentication identifier and the first authentication identifier are the same.

S106: If the first authentication identifier sent to the information requesting terminal matches the second authentication identifier, the server determines access permission of the information requesting terminal.

If determining that the received second authentication identifier that is sent by the information management terminal matches the first authentication identifier sent to the information requesting terminal, the server determines that the information requesting terminal has permission to access the information about the shared resource that the information management terminal stores on the server.

In the embodiment of the content sharing method provided in the present invention, an information requesting terminal requests to access information about a shared resource of a server; and the server sends, by using a timer or by setting a preset time period, an authentication identifier for determining access permission of the information requesting terminal. According to the technical solution provided in this embodiment of the present invention, a server periodically sends an authentication identifier to perform authentication on access permission of an information requesting terminal, which implements natural and secure privacy protection. Meanwhile, an information management terminal is only responsible for performing authorization and authentication on access to shared content. Actual shared content is directly sent from the server to the information requesting terminal and does not need to be forwarded by the information management terminal, which decreases traffic of the information management terminal and saves electric power.

Figure 2:
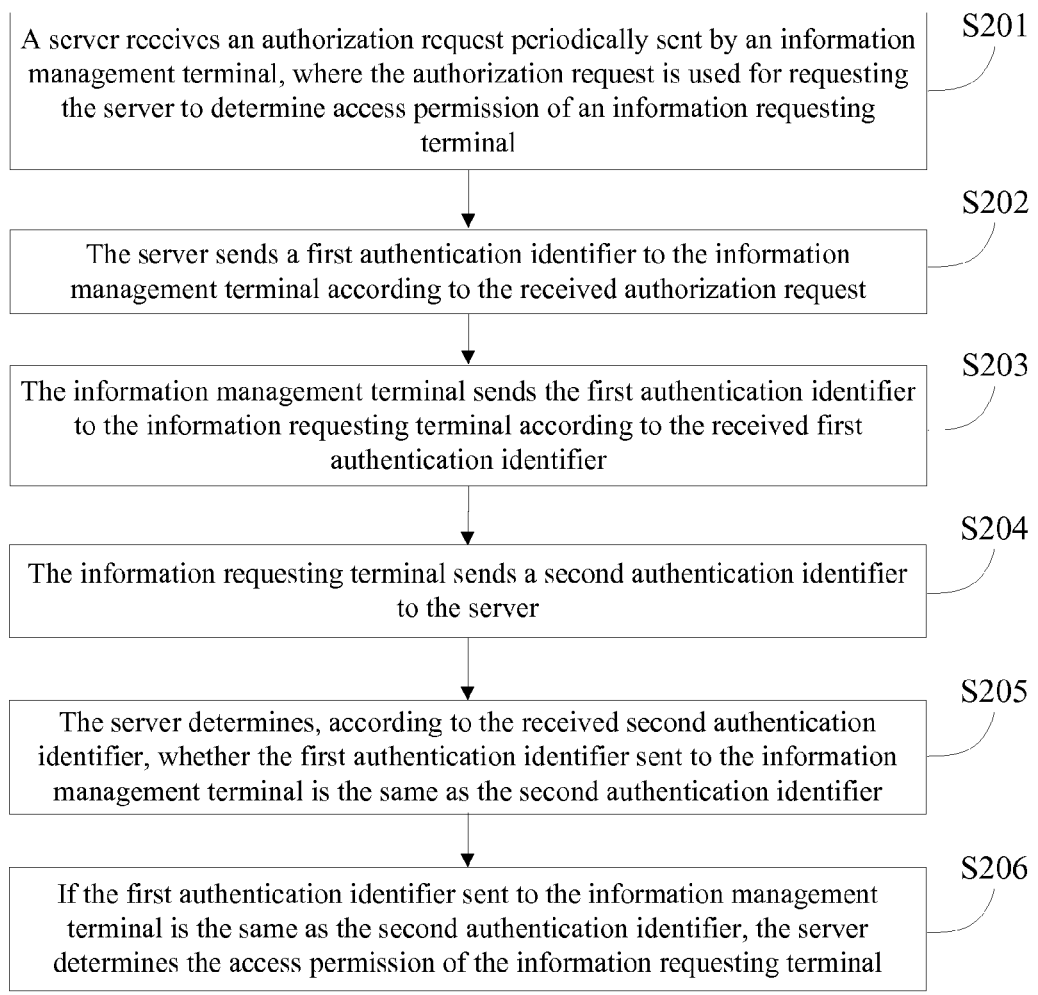
FIG. 2 is a flowchart of a content sharing method according to another embodiment of the present invention.

FIG. 2 is a flowchart of a content sharing method according to another embodiment of the present invention. As shown in FIG. 2, in order to enable an information management terminal to conveniently and securely authorize another person to access content that is used for sharing and stored on a server by the information management terminal, this embodiment of the present invention provides a content sharing method. An information management terminal is a terminal used by the information management terminal, and is configured to provide shared content and store the shared content on a server. An information requesting terminal is a terminal that requests to access the shared content that is stored on the server.

An implementation process of this embodiment of the present invention, as shown in FIG. 2, specifically includes the following:

S201: A server receives an authorization request periodically sent by an information management terminal, where the authorization request is used for requesting the server to determine access permission of an information requesting terminal.

The information management terminal periodically sends the authorization request to the server, where the authorization request is used for requesting the server to determine the access permission of the information requesting terminal. The server is requested to grant the information requesting terminal permission to access shared content.

The information management terminal may include a timer, and sends, triggered by the timer, the authorization request to the server.

The information management terminal may include a setting unit, and periodically sends the authorization request to the server.

In another embodiment of the present invention, before the information management terminal periodically sends the authorization request to the server, the information management terminal sends information about a shared resource to the server. The information about the shared resource may include a list of authorized resources and an identifier of shared information. The list of authorized resources lists content that can be shared and is provided by the information management terminal, and may be but is not limited to a form of a table that lists some or all of content that the information management terminal provides for sharing. The identifier of shared information is used for identifying or locating shared content listed in a list of authorized resources, and specifically may be but is not limited to information that can be used for identifying or locating the shared content, for example, a uniform resource locator (Uniform Resource Locator, URL) and a uniform resource identifier (Uniform Resource Identifier, URI).

The information management terminal periodically sends the authorization request to the server, so as to ensure the access permission of the information requesting terminal, thereby implementing secure and personalized authorization.

S202: The server sends a first authentication identifier to the information management terminal according to the received authorization request.

Therefore, the server determines the access permission of the information requesting terminal according to the received authorization request.

The first authentication identifier is used by the server to authorize the information requesting terminal to access the shared content, and may be but is not limited to a generated string of digit or symbol sequences, or a string of sequences selected or intercepted from an existing digit or symbol sequence set.

S203: The information management terminal sends the first authentication identifier to the information requesting terminal according to the received first authentication identifier.

The information requesting terminal and the information management terminal may perform communication by means of near field communication. The following provides description by using the near field communication as an example. A near field communication system may be but is not limited to all types of wireless communications systems of a wireless local area network or a wireless personal area network, for example, wireless fidelity (Wireless Fidelity, Wi-Fi), Bluetooth (Bluetooth), and near field communication (Near Field Communication, NFC).

The information management terminal establishes a communication connection with the information requesting terminal by using the near field communication system. The information management terminal and the information requesting terminal may perform communication within a close range. Meanwhile, when a distance between the information management terminal and the information requesting terminal increases, the near field communication system cannot perform normal communication because the distance is too far, thereby disconnecting the communication connection.

After the information management terminal establishes the communication connection with the information requesting terminal by using the near field communication system, the communication connection still needs to be kept. When the communication connection is in a connected state, the information requesting terminal can be authorized to access the shared content. When the communication connection is in a disconnected state, access permission of the information requesting terminal for the shared content is terminated.

Optionally, the information management terminal may monitor connection status of the communication connection by using a heartbeat mechanism. The heartbeat mechanism may continuously check the connection status by means of periodically sending a data packet and obtaining an acknowledgement. If the communication connection is disconnected, the information management terminal sends a sharing termination instruction to the server, where the sharing termination instruction is used for enabling the server to terminate the access permission of the information requesting terminal.

Specially, a method used by the information management terminal to send the first authentication identifier to the information requesting terminal may be sending information by using the communication connection established by the near field communication system, or may also be sending information by using a communication connection established by another communications system, where the another communications system may include but is not limited to a near field communication system and also includes multiple types of wireless communications systems such as a Global System for Mobile communications (GSM), a Wideband Code Division Multiple Access (WCDMA) system, Time Division-Synchronous Code Division Multiple Access (TD-SCDMA), a Worldwide Interoperability for Microwave Access (WiMax) system, and a long term evolution (LTE) system.

The information management terminal sends, by means of near field communication, the first authentication identifier to the information requesting terminal according to the received first authentication identifier.

S204: The information requesting terminal sends a second authentication identifier to the server.

The second authentication identifier includes but is not limited to a generated string of digit or symbol sequences, or a string of sequences selected or intercepted from an existing digit or symbol sequence set.

The information requesting terminal and the information management terminal may perform communication by means of near field communication. The following provides description by using the near field communication as an example. A near field communication system may be but is not limited to all types of wireless communications systems of a wireless local area network or a wireless personal area network, for example, wireless fidelity (Wireless Fidelity, Wi-Fi), Bluetooth (Bluetooth), and near field communication (Near Field Communication, NFC).

The information management terminal establishes a communication connection with the information requesting terminal by using the near field communication system. The information management terminal and the information requesting terminal may perform communication within a close range. Meanwhile, when a distance between the information management terminal and the information requesting terminal increases, the near field communication system cannot perform normal communication because the distance is too far, thereby disconnecting the communication connection.

After the information management terminal establishes the communication connection with the information requesting terminal by using the near field communication system, the communication connection still needs to be kept. When the communication connection is in a connected state, the information requesting terminal can be authorized to access the shared content. When the communication connection is in a disconnected state, access permission of the information requesting terminal for the shared content is terminated.

Optionally, the information management terminal may monitor connection status of the communication connection by using a heartbeat mechanism. The heartbeat mechanism may continuously check the connection status by means of periodically sending a data packet and obtaining an acknowledgement. If the communication connection is disconnected, the information management terminal sends a sharing termination instruction to the server, where the sharing termination instruction is used for enabling the server to terminate the access permission of the information requesting terminal.

Specially, a method used by the information requesting terminal to send the second authentication identifier to the server may be sending information by using the communication connection established by the near field communication system, or may also be sending information by using a communication connection established by another communications system, where the another communications system may include but is not limited to a near field communication system and also includes multiple types of wireless communications systems such as a Global System for Mobile communications (GSM), a Wideband Code Division Multiple Access (WCDMA) system, Time Division-Synchronous Code Division Multiple Access (TD-SCDMA), a Worldwide Interoperability for Microwave Access (WiMax) system, and a long term evolution (LTE) system.

In another embodiment of the present invention, an encryption algorithm is negotiated between the information management terminal and the server, so as to enhance security of performing authorization on the shared content, where the encryption algorithm may use symmetric encryption, or may also use asymmetric encryption. When the symmetric encryption is used, the encryption algorithm includes but is not limited to DES, IDEA, RC2, RC4, SKIPJACK, RC5, AES, and the like. When the asymmetric encryption is used, the encryption algorithm includes but is not limited to RSA, Elgamal, a knapsack algorithm, Rabin, D-H, ECC, and the like.

A method for negotiating an encryption algorithm between the information management terminal and the server may be: the information management terminal sends a list of available encryption algorithms to the server according to an encryption algorithm supported by the information management terminal, and the server selects, and determines an encryption algorithm to be used from the list, and notifies the information management terminal.

A method for negotiating an encryption algorithm between the information management terminal and the server may also be: the server selects all available encryption algorithms and sends a list of available encryption algorithms to the information management terminal, and the information management terminal selects and determines an encryption algorithm to be used from the list, and notifies the server.

After the encryption algorithm is negotiated, the information management terminal uses the encryption algorithm determined by the server or the information management terminal to encrypt the received authentication identifier, generates an encrypted second authentication identifier, and sends the encrypted second authentication identifier to the server.

Optionally, the information management terminal may send an authorization level to the server. The authorization level represents permission of the information requesting terminal to perform an operation on the shared content, and may include but is not limited to operations of different levels such as "read only", "duplicatable", "savable", and "modifiable", or a combination of these operations.

Optionally, the information management terminal may send an authorization time limit to the server. The authorization time limit indicates an effective time limit for the information management terminal to perform authorization on the shared content listed in the list of authorized resources. All authorization information is valid only within a term specified by the authorization time limit and is automatically invalidated beyond the authorization time limit.

S205: The server determines, according to the received second authentication identifier, whether the first authentication identifier sent to the information management terminal matches the second authentication identifier.

The server determines, according to the received second authentication identifier that is sent by the information requesting terminal, whether the first authentication identifier sent to the information management terminal matches the second authentication identifier.

In another embodiment of the present invention, if the received second authentication identifier is encrypted, the server decrypts the received second authentication identifier according to a decryption algorithm corresponding to the previously negotiated encryption algorithm, and compares the decrypted second authentication identifier and the authentication identifier that the server sends to the information management terminal to determine whether the decrypted second authentication identifier and the first authentication identifier are the same.

S206: If the first authentication identifier sent to the information management terminal matches the second authentication identifier, the server determines the access permission of the information requesting terminal.

If determining that the received second authentication identifier that is sent by the information requesting terminal matches the first authentication identifier sent to the information management terminal, the server determines that the information requesting terminal has permission to access the information about the shared resource that the information management terminal stores on the server.

In the embodiment of the content sharing method provided in the present invention, an information management terminal requests a server to perform authentication on access permission of an information requesting terminal; and the server sends, by using a timer or by setting a preset time period, an authentication identifier for determining the access permission of the information requesting terminal. According to the technical solution provided in this embodiment of the present invention, a server periodically sends an authentication identifier to perform authentication on access permission of an information requesting terminal, which implements natural and secure privacy protection. Meanwhile, an information management terminal is only responsible for performing authorization and authentication on access to shared content. Actual shared content is directly sent from the server to the information requesting terminal and does not need to be forwarded by the information management terminal, which decreases traffic of the information management terminal and saves electric power.

Figure 3A:
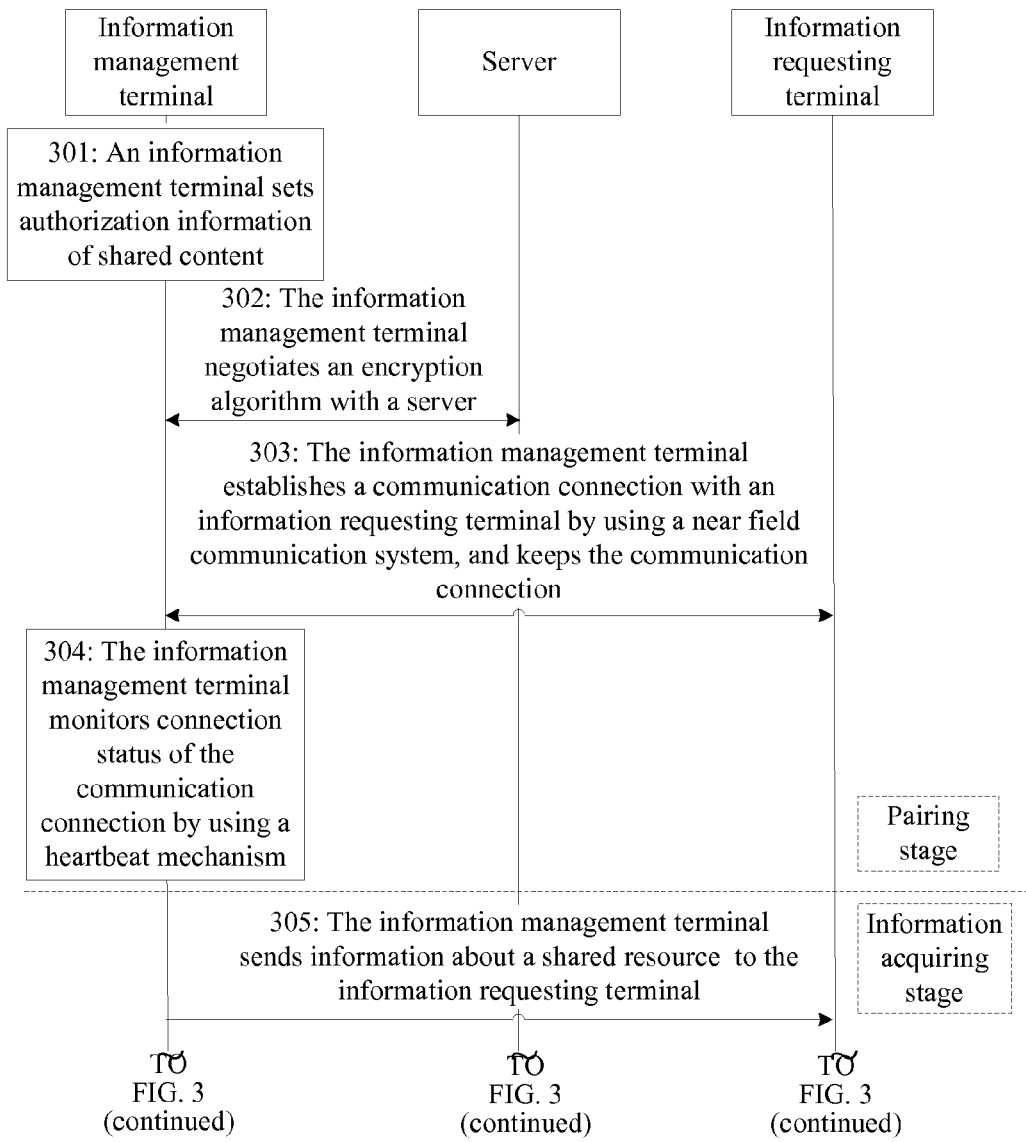
FIG. 3A and FIG. 3B are a flowchart of a content sharing method according to another embodiment of the present invention.
Figure 3B:
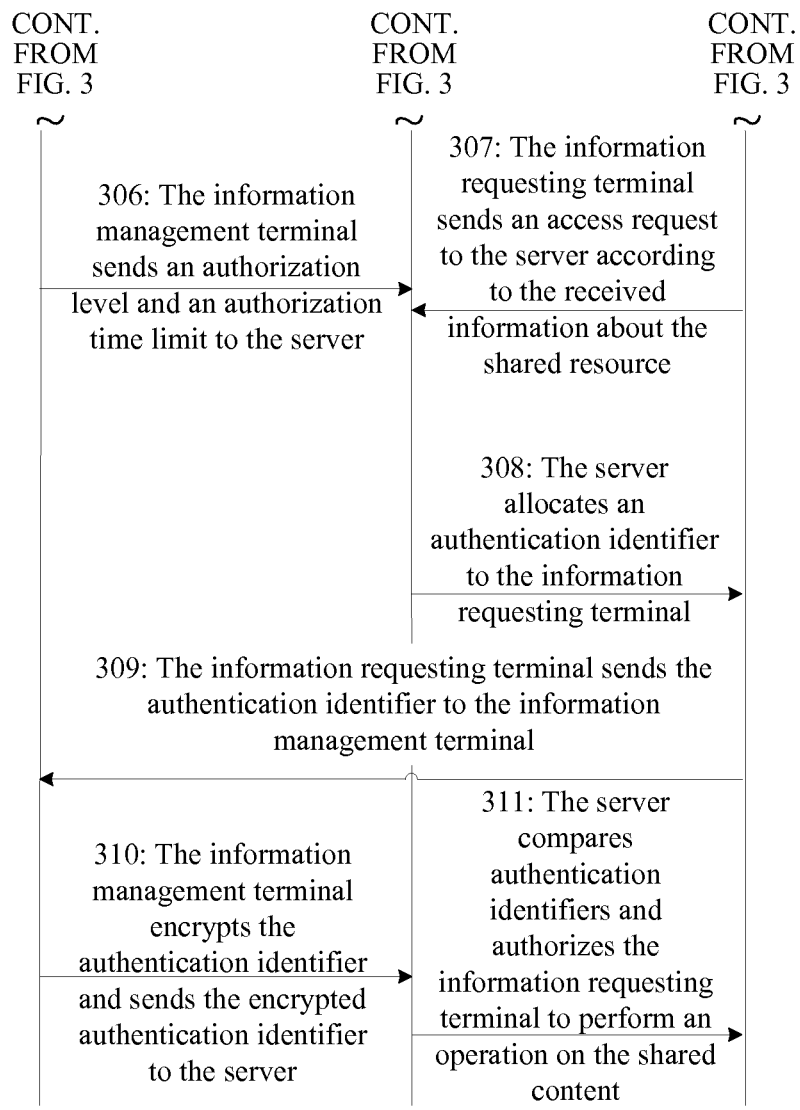

FIG. 3A and FIG. 3B are a flowchart of a content sharing method according to another embodiment of the present invention. As shown in FIG. 3A and FIG. 3B, in order to enable an information management terminal to conveniently and securely authorize another person to access content that the information management terminal shares on a server, this embodiment provides a content sharing method. An information requesting terminal can access content that an information management terminal shares on a server only by completing pairing with the information management terminal. The technical solution provided in this embodiment includes two stages, namely a pairing stage and an information acquiring stage. As shown in FIG. 3A and FIG. 3B, a specific process is as follows:

The pairing stage includes steps 301 to 304 and is specifically as follows:

301: An information management terminal sets authorization information of shared content.

The information management terminal sets the authorization information for the shared content. The authorization information may include but is not limited to a list of authorized resources, an identifier of shared information, an authorization level, an authorization time limit, and the like.

The list of authorized resources lists the shared content of the information management terminal, and may be but is not limited to a form of a table that, as shown in Table 1, lists some or all of content that the information management terminal provides for sharing. The identifier of shared information is used for identifying the shared content, may be but is not limited to information such as a URL and a URI, and can be used for identifying or locating the shared content. The authorization level indicates permission that an information requesting terminal obtains for performing an operation on the shared content, and may include but is not limited to operations of different levels such as "read only", "duplicatable", "savable", and "modifiable", or a combination of these operations. The authorization time limit indicates an effective time limit for the information management terminal to perform authorization on the shared content listed in the list of authorized resources. All authorization information is valid only within a term specified by the authorization time limit and is automatically invalidated beyond the authorization time limit.

TABLE 1

| List of Authorized Resources | Identifier of Shared Information | Authorization Level | Authorization Time Limit (Hour) |
| --- | --- | --- | --- |
| Content 01 | URL01 | Read only | 5 |
| Content 02 | URL02 | Modifiable | 2 |
| Content 03 | URI01 | Duplicatable | 4 |
| Content 04 | URI02 | Read only/Savable | 4 |
| . . . | . . . | . . . | . . . |

Optionally, this step may be that the information management terminal performs one-off setting during initialization, uses this setting manner for each subsequent authorization operation, saves the authorization information, and does not need to repeatedly perform setting; or may also be that the information management terminal performs setting for each authorization operation and obtains the authorization information by using different setting manners.

302: The information management terminal negotiates an encryption algorithm with a server.

The encryption algorithm may be negotiated between the information management terminal and the server, so as to ensure security of the authorization information of the shared content. Symmetric encryption or asymmetric encryption may be used. When the symmetric encryption is used, the encryption algorithm includes but is not limited to DES, IDEA, RC2, RC4, SKIPJACK, RC5, AES, and the like. When the asymmetric encryption is used, the encryption algorithm includes but is not limited to RSA, Elgamal, a knapsack algorithm, Rabin, D-H, ECC, and the like.

Optionally, this step may be that the information management terminal performs one-off setting when connecting to the server, uses the encryption algorithm for each subsequent authorization operation, and does not need to repeatedly perform setting; or may also be that the information management terminal performs setting for each authorization operation separately and uses different encryption algorithms.

303: The information management terminal establishes a communication connection with an information requesting terminal by using a near field communication system, and keeps the communication connection.

The information management terminal establishes the communication connection with the information requesting terminal by using the near field communication system. The communication connection is established by using a system including but not limited to Wi-Fi, Bluetooth, and NFC. The information management terminal and the information requesting terminal may perform communication within a close range. Meanwhile, when a distance between the information management terminal and the information requesting terminal increases, the near field communication system cannot perform normal communication because the distance is too far, thereby disconnecting the communication connection.

After the information management terminal establishes the communication connection with the information requesting terminal by using the near field communication system, the communication connection still needs to be kept. When the communication connection is in a connected state, the information requesting terminal can be authorized to access the shared content. When the communication connection is in a disconnected state, access permission of the information requesting terminal for the shared content is terminated.

304: The information management terminal monitors connection status of the communication connection by using a heartbeat mechanism.

The information management terminal may monitor the connection status of the communication connection by using the heartbeat mechanism. The heartbeat mechanism may continuously check the connection status by means of periodically sending a data packet and obtaining an acknowledgement. If the communication connection is disconnected, the information management terminal sends a sharing termination instruction to the server, where the sharing termination instruction is used for enabling the server to terminate the access permission of the information requesting terminal.

The information acquiring stage includes steps 305 to 311 that may be but is not limited to be periodically repeatedly executed, and is specifically as follows:

305: The information management terminal sends information about a shared resource to the information requesting terminal.

The authorization information that the information management terminal sets, in step 301, for the shared content is shown in Table 1. The information about the shared resource includes a list of authorized resources and an identifier of shared information, and may be but is not limited to a form of a table, as shown in Table 2. The information management terminal sends a list of shared information to the information requesting terminal.

TABLE 2

| List of Authorized Resources | Identifier of Shared Information |
| --- | --- |
| Content 01 | URL01 |
| Content 02 | URL02 |

TABLE 2-continued

| List of Authorized Resources | Identifier of Shared Information |
| --- | --- |
| Content 03 | URI01 |
| Content 04 | URI02 |
| . . . | . . . |

306: The information management terminal sends an authorization level and an authorization time limit to the server.

The authorization information that the information management terminal sets, in step 301, for the shared content is shown in Table 1. The authorization level and the authorization time limit are listed, as shown in Table 3. The information management terminal sends the authorization level and the authorization time limit to the server.

TABLE 3

| List of Authorized Resources | Authorization Level | Authorization Time Limit (Hour) |
| --- | --- | --- |
| Content 01 | Read only | 5 |
| Content 02 | Modifiable | 2 |
| Content 03 | Duplicatable | 4 |
| Content 04 | Read only/Savable | 4 |
| . . . | . . . | . . . |

307: The information requesting terminal sends an access request to the server according to the received information about the shared resource.

In the received information about the shared resource, the information requesting terminal may receive specific information of the shared content provided by the information management terminal, for example, if the information requesting terminal needs to access content 03 listed in the list of authorized resources and a corresponding identifier of shared information is URI01, the information requesting terminal may further send an access request for accessing the content 03 to the server to trigger the server to deliver an authentication identifier.

308: The server allocates an authentication identifier to the information requesting terminal.

When the information requesting terminal requests to access the shared content on the server, the server generates the authentication identifier and allocates the authentication identifier to the information requesting terminal.

The authentication identifier may be but is not limited to a string of digit or symbol sequences that is randomly generated, or a string of sequences randomly selected or intercepted from an existing digit or symbol sequence set.

Optionally, the authentication identifier may be set with an effective time term, namely an authentication identifier time limit, and is used for performing authentication when the information requesting terminal accesses information about the shared content of the server. If a term specified by the authentication identifier time limit is exceeded, the authentication identifier is invalidated and the server needs to re-generate an authentication identifier. Optionally, the server may set a separate authentication identifier for each access operation, or may also set to use a same authentication identifier for multiple access operations within the authentication identifier time limit.

309: The information requesting terminal sends the authentication identifier to the information management terminal.

The information requesting terminal may receive the authentication identifier allocated by the server in step 308 and forwards the authentication identifier to the information management terminal.

310: The information management terminal encrypts the authentication identifier and sends the encrypted authentication identifier to the server.

In step 302, the information management terminal and the server negotiates an encryption algorithm to be used. In step 309, the information management terminal receives the authentication identifier that is allocated by the server to the information requesting terminal. In this step, the information management terminal needs to use the encryption algorithm, which is negotiated by the server and the information management terminal, to encrypt the authentication identifier.

The information management terminal sends the encrypted authentication identifier to the server, where the encrypted authentication identifier is subsequently used for performing authentication when the information requesting terminal accesses the shared content information of the server.

311: The server decrypts the authentication identifiers and authorizes the information requesting terminal to perform an operation on the shared content.

The server receives the encrypted authentication identifier sent by the information requesting terminal and uses a decryption algorithm corresponding to the encryption algorithm determined, by means of negotiation, by the information management terminal and the server to decrypt the encrypted authentication identifier.

If the server successfully decrypts the authentication identifier, the information requesting terminal is authorized to perform the operation on the shared content within the authorization time limit according to the authorization information set by the information management terminal.

If the server fails to decrypt the authentication identifier, the information requesting terminal is rejected to access the shared content of the server.

In the technical solution provided in this embodiment, an information management terminal can control a spatial distance condition of authorization when authorizing another person to access content that the information management terminal shares on a server. When an information requesting terminal needs to access shared content of the information management terminal, the information requesting terminal can access the shared content according to an authorization level set by the information management terminal only when a distance between the information requesting terminal and the information management terminal is near enough and an authorization time limit is not exceeded. When the information management terminal leaves or the authorization time limit is exceeded, access permission is automatically removed, thereby implementing natural and secure privacy protection.

Figure 4:
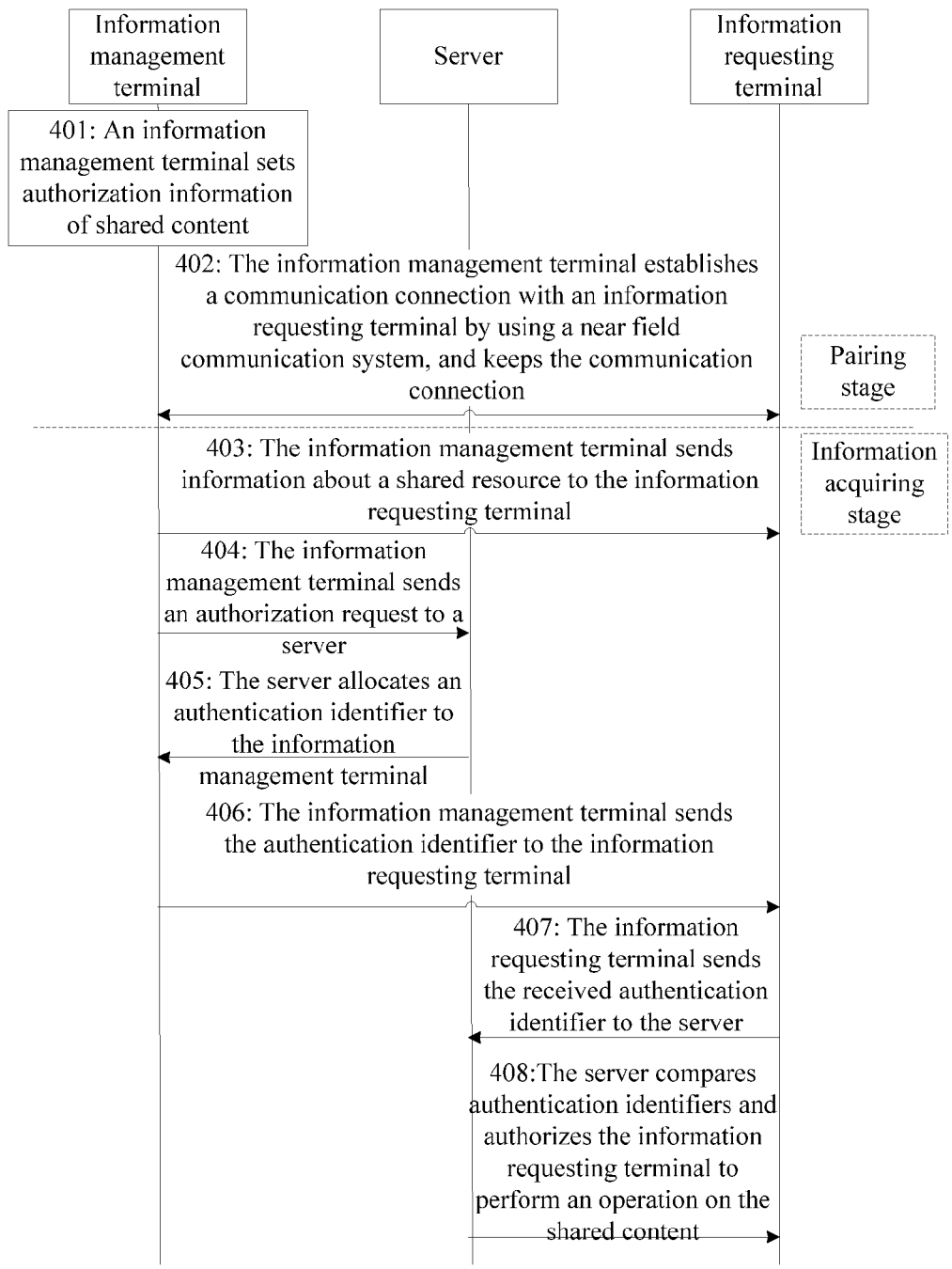
FIG. 4 is a flowchart of a content sharing method according to another embodiment of the present invention.

FIG. 4 is a flowchart of a content sharing method according to another embodiment of the present invention. As shown in FIG. 4, in order to enable an information management terminal to conveniently and securely authorize another person to access content that the information management terminal shares on a server, this embodiment provides a content sharing method. An information requesting terminal can access the content that the information management terminal shares on the server only by completing pairing with the information management terminal. The technical solution provided in this embodiment includes two stages, namely a pairing stage and an information acquiring stage. As shown in FIG. 4, a specific process is as follows:

The pairing stage includes steps 401 to 402 and is specifically as follows:

401: An information management terminal sets authorization information of shared content.

The information management terminal sets the authorization information for the shared content. The authorization information may include but is not limited to a list of authorized resources, an identifier of shared information, and the like.

The list of authorized resources lists the shared content of the information management terminal, and may be but is not limited to a form of a table that, as shown in Table 4, lists some or all of content that the information management terminal provides for sharing. The identifier of shared information is used for identifying the shared content, may be but is not limited to information such as a URL and a URI, and can be used for identifying or locating the shared content. An authorization level indicates permission that an information requesting terminal obtains for performing an operation on the shared content, and may include but is not limited to operations of different levels such as "read only", "duplicatable", "savable", and "modifiable", or a combination of these operations. An authorization time limit indicates an effective time limit for the information management terminal to perform authorization on the shared content listed in the list of authorized resources. All authorization information is valid only within a term specified by the authorization time limit and is automatically invalidated beyond the authorization time limit.

TABLE 4

| List of Authorized Resources | Identifier of Shared Information |
|---|---|
| Content 01 | URL01 |
| Content 02 | URL02 |
| Content 03 | URL03 |
| Content 04 | URL04 |
| ... | ... |

Optionally, this step may be that the information management terminal performs one-off setting during initialization, uses this setting manner for each subsequent authorization operation, saves the authorization information, and does not need to repeatedly perform setting; or may also be that the information management terminal performs setting for each authorization operation and obtains the authorization information by using different setting manners.

402: The information management terminal establishes a communication connection with an information requesting terminal by using a near field communication system, and keeps the communication connection.

The information management terminal establishes the communication connection with the information requesting terminal by using the near field communication system. The communication connection is established by using a system including but not limited to Wi-Fi, Bluetooth, and NFC. The information management terminal and the information requesting terminal may perform communication within a close range. Meanwhile, when a distance between the information management terminal and the information requesting terminal increases, the near field communication system cannot perform normal communication because the distance is too far, thereby disconnecting the communication connection.

After the information management terminal establishes the communication connection with the information requesting terminal by using the near field communication system, the communication connection still needs to be kept. When the communication connection is in a connected state, the information requesting terminal can be authorized to access the shared content. When the communication connection is in a disconnected state, access permission of the information requesting terminal for the shared content is terminated.

The information acquiring stage includes steps 403 to 407 that may be but is not limited to be periodically repeatedly executed, and is specifically as follows:

403: The information management terminal sends information about a shared resource to the information requesting terminal.

The authorization information that the information management terminal sets, in step 401, for the shared content is shown in Table 4. The information about the shared resource includes a list of authorized resources and an identifier of shared information, and may be but is not limited to a form of a table, as shown in Table 5. The information management terminal sends a list of shared information to the information requesting terminal.

TABLE 5

| List of Authorized Resources | Identifier of Shared Information |
|---|---|
| Content 01 | URL01 |
| Content 02 | URL02 |
| Content 03 | URL03 |
| Content 04 | URL04 |
| ... | ... |

404: The information management terminal sends an authorization request to a server.

After sending the information about the shared resource to the information requesting terminal, the information management terminal may send the authorization request to the server to require the server to grant the information requesting terminal permission to access the shared content.

405: The server allocates an authentication identifier to the information management terminal.

The server generates the authentication identifier and allocates the authentication identifier to the information management terminal.

The authentication identifier may be but is not limited to a string of digit or symbol sequences that is randomly generated, or a string of sequences randomly selected or intercepted from an existing digit or symbol sequence set.

Optionally, the authentication identifier may be set with an effective time term, namely an authentication identifier time limit, and is used for performing authentication when the information requesting terminal accesses information about the shared content of the server. If a term specified by the authentication identifier time limit is exceeded, the authentication identifier is invalidated and the server needs to re-generate an authentication identifier. Optionally, the server may set a separate authentication identifier for each access operation, or may also set to use a same authentication identifier for multiple access operations within the authentication identifier time limit.

406: The information management terminal sends the authentication identifier to the information requesting terminal.

After receiving the authentication identifier allocated by the server, the information management terminal forwards the authentication identifier to the information requesting terminal for performing authentication when the information requesting terminal accesses the shared content of the server.

407: The information requesting terminal sends the received authentication identifier to the server.

The information requesting terminal receives the authentication identifier sent by the information management terminal and sends the authentication identifier to the server, where the authentication identifier is used for the server to perform authentication on a shared accessing request of the information requesting terminal.

408: The server compares the authentication identifier sent by the information requesting terminal and the authentication identifier allocated to the information management terminal, and authorizes the information requesting terminal to perform an operation on the shared content.

The server receives the authentication identifier sent by the information requesting terminal and compares the received authentication identifier with the authentication identifier allocated to the information management terminal.

If the authentication identifier sent by the information requesting terminal matches the authentication identifier allocated by the information management terminal, the information requesting terminal is authorized to perform the operation on the shared content according to the authorization information set by the information management terminal.

If the authentication identifier sent by the information requesting terminal does not match the authentication identifier allocated by the information management terminal, the information requesting terminal is rejected to access the shared content of the server.

In the embodiment of the content sharing method provided in this embodiment of the present invention, an information management terminal can control spatial distance and time term conditions of authorization when authorizing another person to access content that the information management terminal shares on a server. When an information requesting terminal needs to access shared content of the information management terminal, the information requesting terminal can access the content that the information management terminal shares on the server only when a distance between the information requesting terminal and the information management terminal is near enough. When the information management terminal leaves, access permission is automatically removed, thereby implementing natural and secure privacy protection.

Figure 5:
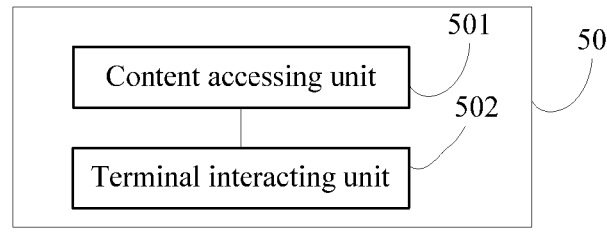
FIG. 5 is a schematic diagram of an apparatus for accessing shared content according to an embodiment of the present invention.

FIG. 5 is a schematic diagram of an apparatus for accessing shared content according to an embodiment of the present invention. As shown in FIG. 5, in order to enable an information management terminal to conveniently and securely authorize another person to access content that the information management terminal shares on a server, this embodiment provides an apparatus 50 for accessing shared content. As shown in FIG. 5, the apparatus 50 includes a content accessing unit 501 and a terminal interacting unit 502.

The content accessing unit 501 is configured to send an access request to a server, where the access request carries information about a shared resource requested to be accessed, and receive a first authentication identifier periodically sent by the server.

The terminal interacting unit 502 is configured to send the first authentication identifier to an information management terminal, so that the information management terminal requests, according to the first authentication identifier, the server to perform authentication and determine access permission to enable the content accessing unit to access the information about the shared resource.

Figure 6:
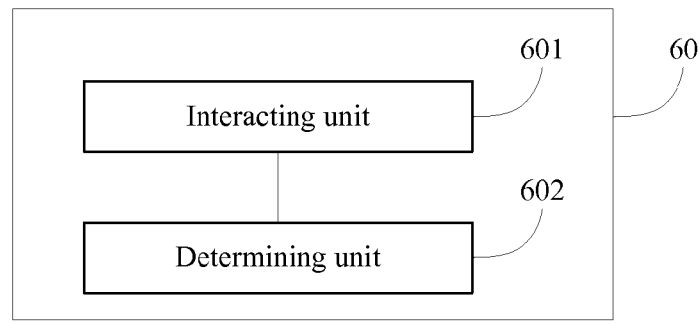
FIG. 6 is a schematic diagram of a content sharing server 60 according to another embodiment of the present invention.

FIG. 6 is a schematic diagram of a content sharing apparatus 60 according to another embodiment of the present invention. As shown in FIG. 6, the apparatus 60 includes an interacting unit 601 and a determining unit 602.

The interacting unit 601 is configured to receive an access request sent by an information requesting terminal, where the access request carries information about a shared resource that the information requesting terminal requests to access, periodically send a first authentication identifier to the information requesting terminal according to the received access request, and receive a second authentication identifier sent by the information management terminal.

The determining unit 602 is configured to determine, according to the received second authentication identifier, whether the first authentication identifier sent to the information requesting terminal matches the second authentication identifier, and if the first authentication identifier sent to the information requesting terminal matches the second authentication identifier, determine access permission of the information requesting terminal.

Figure 7:
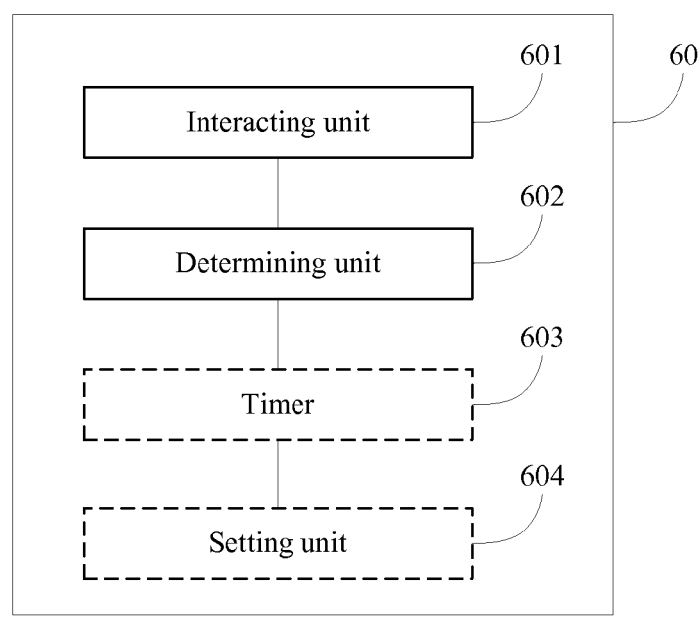
FIG. 7 is a schematic diagram of a content sharing server 60 according to another embodiment of the present invention.

FIG. 7 is a schematic diagram of a content sharing apparatus 60 according to another embodiment of the present invention. As shown in FIG. 7, the apparatus 60 further includes a timer 603.

The timer 603 is configured to trigger, at regular time according to the received access request, the periodic sending of the first authentication identifier to the information requesting terminal.

The interacting unit 601 is configured to periodically send the first authentication identifier to the information requesting terminal according to the triggering by the apparatus 603.

In another embodiment of the present invention, the apparatus 60 further includes a setting unit 604.

The setting unit 604 is configured to set a preset time period; and the interacting unit 601 is configured to periodically send the first authentication identifier to the information requesting terminal according to the received access request and the preset time period.

Figure 8:
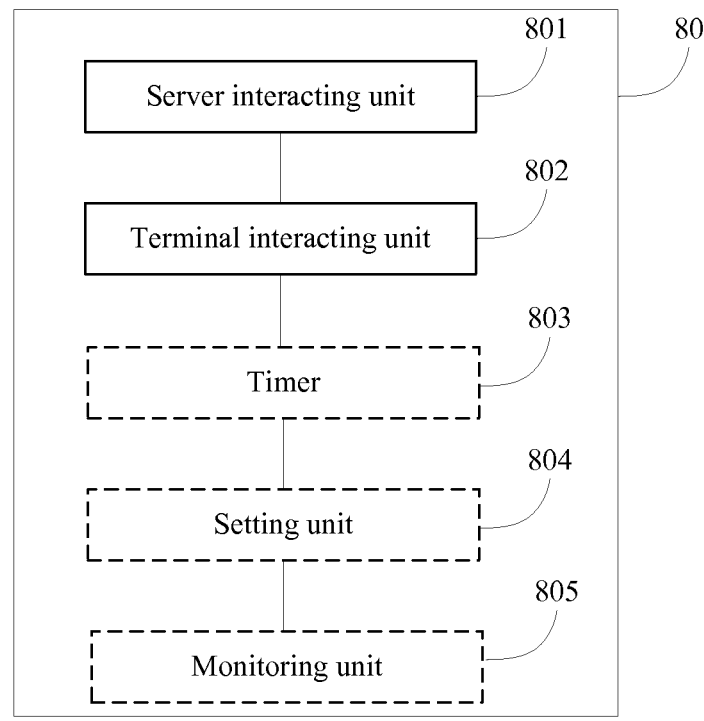
FIG. 8 is a schematic diagram of a content sharing apparatus 80 according to another embodiment of the present invention.

FIG. 8 is a schematic diagram of a content sharing apparatus 80 according to another embodiment of the present invention. As shown in FIG. 8, the apparatus 80 includes a server interacting unit 801 and a terminal interacting unit 802.

The server interacting unit 801 is configured to periodically send an authorization request to a server, where the authorization request is used for requesting the server to determine access permission of an information requesting terminal.

The terminal interacting unit 802 is configured to receive a first authentication identifier sent by the information management terminal, where the first authentication identifier is sent to an information management terminal by the server according to the authorization request.

The server interacting unit 802 is further configured to send a second authentication identifier to the server according to the first authentication identifier, so that the server determines the access permission of the information requesting terminal according to the second authentication identifier.

In another embodiment of the present invention, the apparatus further includes a timer 803.

The timer 803 is configured to trigger, at regular time, the periodic sending of the authorization request to the server; and the server interacting unit 801 is configured to periodically send the authorization request to the server according to the triggering by the timer.

In another embodiment of the present invention, the apparatus further includes a setting unit 804.

The setting unit 804 is configured to set a preset time period; and the server interacting unit 801 is further configured to periodically send the authorization request to the server according to the preset time period.

In another embodiment of the present invention, the apparatus further includes a monitoring unit 805.

The monitoring unit 805 is configured to monitor connection status of the information requesting terminal and the information management terminal by using a heartbeat mechanism; and the server interacting unit 801 is further configured to: if the monitoring unit monitors that the communication connection is disconnected, send a sharing termination instruction to the server, where the sharing termination instruction is used for enabling the server to terminate authorization for access performed by the information requesting terminal.

In the embodiment of the content sharing apparatus provided in the present invention, an information requesting terminal requests to access information about a shared resource of a server; and the server sends, by using a timer or by setting a preset time period, an authentication identifier for determining access permission of the information requesting terminal. According to the technical solution provided in this embodiment of the present invention, a server periodically sends an authentication identifier to perform authentication on access permission of an information requesting terminal, which implements natural and secure privacy protection. Meanwhile, an information management terminal is only responsible for performing authorization and authentication on access to shared content. Actual shared content is directly sent from the server to the information requesting terminal and does not need to be forwarded by the information management terminal, which decreases traffic of the information management terminal and saves electric power.

Figure 9:
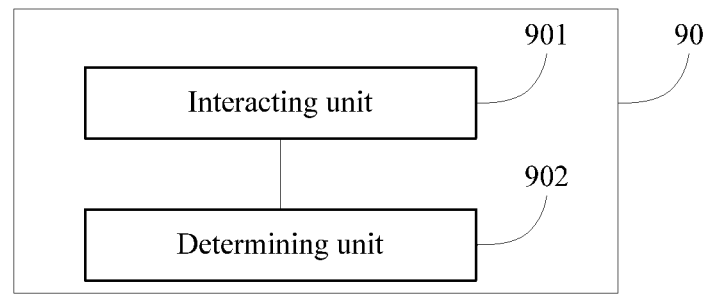
FIG. 9 is a schematic diagram of a content sharing server according to another embodiment of the present invention.

FIG. 9 is a schematic diagram of a content sharing apparatus 90 according to another embodiment of the present invention. As shown in FIG. 9, the content sharing apparatus 90 includes an interacting unit 901 and a determining unit 902.

The interacting unit 901 is configured to receive an authorization request periodically sent by an information management terminal, where the authorization request is used for requesting to determine access permission of an information requesting terminal, and according to the received authorization request, send a first authentication identifier to the information management terminal and receive a second authentication identifier sent by the information requesting terminal according to the first authentication identifier.

The determining unit 902 is configured to determine, according to the received second authentication identifier, whether the first authentication identifier sent to the information management terminal matches the second authentication identifier, and if the first authentication identifier sent to the information management terminal matches the second authentication identifier, determine the access permission of the information requesting terminal.

In the embodiment of the content sharing apparatus provided in the present invention, an information management terminal requests a server to perform authentication on access permission of an information requesting terminal; and the server sends, by using a timer or by setting a preset time period, an authentication identifier for determining the access permission of the information requesting terminal. According to the technical solution provided in this embodiment of the present invention, a server periodically sends an authentication identifier to perform authentication on access permission of an information requesting terminal, which implements natural and secure privacy protection. Meanwhile, an information management terminal is only responsible for performing authorization and authentication on access to shared content. Actual shared content is directly sent from the server to the information requesting terminal and does not need to be forwarded by the information management terminal, which decreases traffic of the information management terminal and saves electric power.

Figure 10:
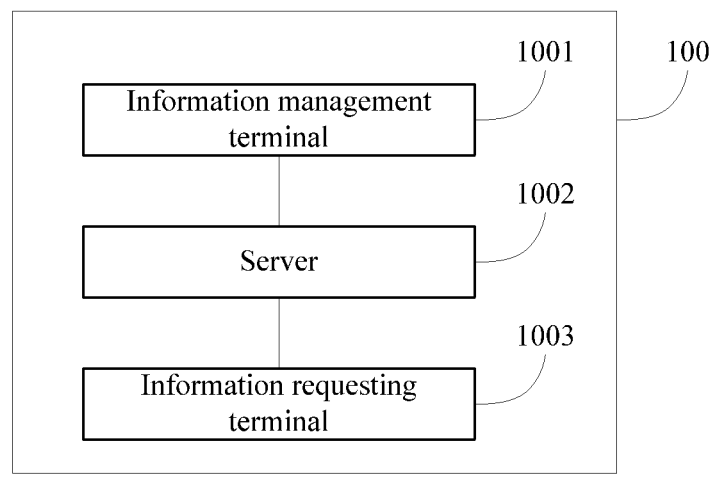
FIG. 10 is a schematic block diagram of a content sharing system 100 according to an embodiment of the present invention.

FIG. 10 is a schematic block diagram of a content sharing system 100 according to an embodiment of the present invention. As shown in FIG. 10, the system 100 includes an information management terminal 1001, a server 1002, and an information requesting terminal 1003.

The information requesting terminal 1003 is configured to send an access request to the server 1002, where the access request carries information about a shared resource that the information requesting terminal 1003 requests to access, receive a first authentication identifier sent by the server, and send the first authentication identifier to the information management terminal 1001 according to the received first authentication identifier.

The information management terminal 1001 is configured to receive the first authentication identifier sent by the information management terminal 1001 and send a second authentication identifier to the server 1002.

The server 1002 is configured to receive the access request sent by the information requesting terminal, where the access request carries the information about the shared resource that the information requesting terminal 1003 requests to access, periodically send the first authentication identifier to the information requesting terminal 1003 according to the received access request, determine, according to the received second authentication identifier sent by the information management terminal 1001, whether the first authentication identifier sent to the information requesting terminal 1003 matches the second authentication identifier, and if the first authentication identifier sent to the information requesting terminal 1003 matches the second authentication identifier, determine access permission of the information requesting terminal.

In another embodiment of the present invention, the server 1002 is further configured to periodically send the first authentication identifier to the information requesting terminal 1003 according to triggering by a timer.

In another embodiment of the present invention, the server 1002 is further configured to periodically send the first authentication identifier to the information requesting terminal 1003 according to the received access request and a preset time period.

In another embodiment of the present invention, the information management terminal 1001 is further configured to monitor connection status of the information management terminal 1001 and the information requesting terminal 1003 by using a heartbeat mechanism, and if a communication connection is disconnected, send a sharing termination instruction to the server 1002, where the sharing termination instruction is used for enabling the server 1002 to terminate authorization for access performed by the information requesting terminal.

In the embodiment of the content sharing system provided in the present invention, an information requesting terminal requests to access shared resource information of a server; and the server sends, by using a timer or by setting a preset time period, an authentication identifier for determining access permission of the information requesting terminal. According to the technical solution provided in this embodiment of the present invention, a server periodically sends an authentication identifier to perform authentication on access permission of an information requesting terminal, which implements natural and secure privacy protection. Meanwhile, an information management terminal is only responsible for performing authorization and authentication on access to shared content. Actual shared content is directly sent from the server to the information requesting terminal and does not need to be forwarded by the information management terminal, which decreases traffic of the information management terminal and saves electric power.

Figure 11:
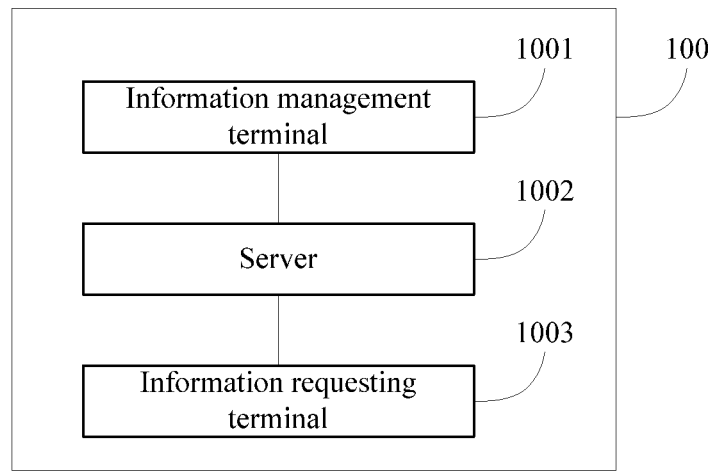
FIG. 11 is a schematic diagram of a content sharing system 110 according to an embodiment of the present invention.

FIG. 11 is a schematic diagram of a content sharing system 110 according to an embodiment of the present invention. As shown in FIG. 11, the system 110 includes an information management terminal 1101, a server 1102, and an information requesting terminal 1103.

The information management terminal 1101 is configured to periodically send an authorization request to the server 1102, where the authorization request is used for requesting the server 1102 to determine access permission of the information requesting terminal 1103, and receive a first authentication identifier sent by the server 1102.

The information requesting terminal 1103 is configured to receive the first authentication identifier sent by the information management terminal 1101 and send a second authentication identifier to the server 1102.

The server 1102 is configured to receive the authorization request periodically sent by the information management terminal 1101, where the authorization request is used for requesting the server 1102 to determine the access permission of the information requesting terminal 1103, send the first authentication identifier to the information management terminal 1101 according to the received authorization request, receive the second authentication identifier sent by the information requesting terminal 1103, determine, according to the received second authentication identifier, whether the first authentication identifier sent to the information management terminal 1101 matches the second authentication identifier, and if the first authentication identifier sent to the information management terminal 1101 matches the second authentication identifier, determine the access permission of the information requesting terminal 1103.

In another embodiment of the present invention, the information management terminal 1101 is further configured to periodically send the authorization request to the server 1102 according to triggering by a timer.

In another embodiment of the present invention, the information management terminal 1101 is further configured to periodically send the authorization request to the server 1102 according to a preset time period.

In another embodiment of the present invention, the information management terminal 1101 is further configured to monitor connection status of the information management terminal 1101 and the information requesting terminal 1103 by using a heartbeat mechanism; and if the communication connection is disconnected, send a sharing termination instruction to the server 1102, where the sharing termination instruction is used for enabling the server 1102 to terminate authorization for access performed by the information requesting terminal.

In the embodiment of the content sharing system provided in the present invention, an information management terminal requests a server to perform authentication on access permission of an information requesting terminal; and the server sends, by using a timer or by setting a preset time period, an authentication identifier for determining the access permission of the information requesting terminal. According to the technical solution provided in this embodiment of the present invention, a server periodically sends an authentication identifier to perform authentication on access permission of an information requesting terminal, which implements natural and secure privacy protection. Meanwhile, an information management terminal is only responsible for performing authorization and authentication on access to shared content. Actual shared content is directly sent from the server to the information requesting terminal and does not need to be forwarded by the information management terminal, which decreases traffic of the information management terminal and saves electric power.

Figure 12:
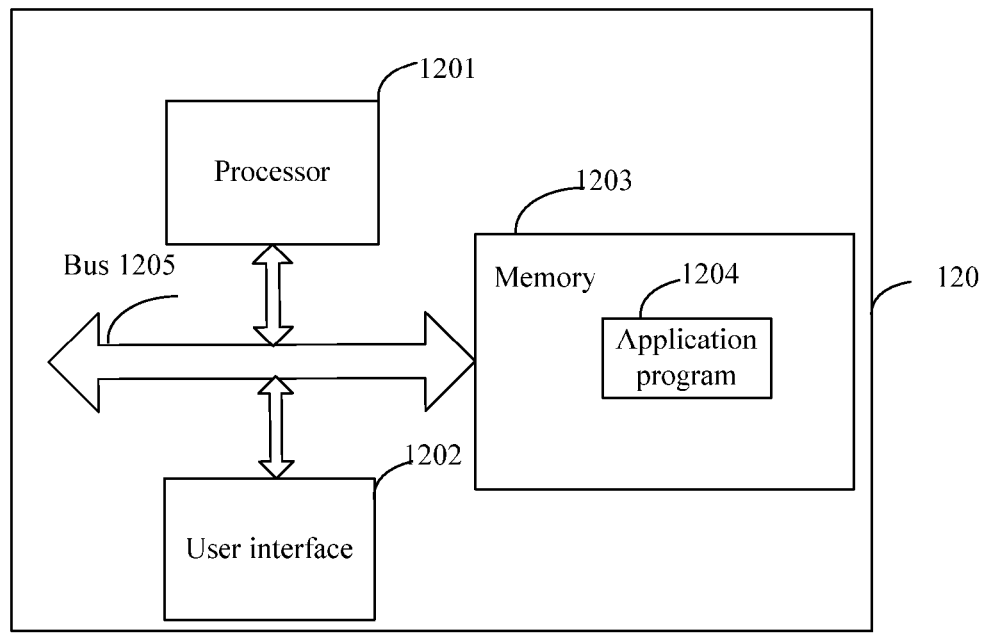
FIG. 12 is a schematic block diagram of a content sharing apparatus 120 according to an embodiment of the present invention.

FIG. 12 is a schematic block diagram of a content sharing apparatus 120 according to an embodiment of the present invention. As shown in FIG. 12, in order to enable an information management terminal to conveniently and securely authorize another person to access content that the information management terminal shares on a server, this embodiment provides a content sharing apparatus 120. As shown in FIG. 12, the content sharing apparatus 120 specifically includes a processor 1201, a user interface 1202, a memory 1203, an application program 1204, and a bus 1205.

The processor 1201 is configured to execute a program, which is stored by the memory 1203, of this embodiment of the present invention, and perform bidirectional communication with another apparatus by using the bus 1205.

The memory 1203 may include but is not limited to one or more of a computer floppy disk, a USB drive, a removable hard disk, a read-only memory (ROM, Read-Only Memory), a random access memory (RAM, Random Access Memory), a magnetic disk, an optical disc, or the like. The memory 1203 is configured to store a program capable of executing this embodiment of the present invention or an application database of this embodiment of the present invention, receive, by using the bus 1205, input of another component or stored information invoked by another component, for example, an instruction of querying a text information identifier, and an instruction of querying a media information identifier, a text content identifier, and a keyword identifier.

The application program 1204 includes all types of system programs and is configured to implement all types of application services.

The user interface 1202 is open to a user, and is configured to connect to a terminal and perform data exchange.

The processor 1201 and the memory 1203 may also be integrated as a physical module applying this embodiment of the present invention. On the physical module, a program implementing this embodiment of the present invention is stored and run.

All components of the apparatus 120 are coupled together by using the bus 1205. In addition to a data bus, the bus 1205 may also include a power bus, a control bus, a status signal bus, and the like. However, for clear description, all buses are expressed as the bus 1205 in the figure.

In this embodiment of the present invention, each unit of the terminal 120 executes the following content respectively:

1202: The user interface is specifically configured to: receive a first authentication identifier sent by an information requesting terminal and send a second authentication identifier to a server.

Optionally, the user interface 1202 may be further configured to monitor connection status of a communication connection by using a heartbeat mechanism.

Optionally, if the communication connection is disconnected, the user interface 1202 is configured to send a sharing termination instruction to the server, where the sharing termination instruction is used for enabling the server to terminate authorization for access performed by the information requesting terminal.

Optionally, the user interface 1202 is configured to negotiate an encryption algorithm with the server.

Optionally, the user interface 1202 is configured to send an authorization level to the server, where the authorization level represents permission for the information requesting terminal to perform an operation on shared content.

Optionally, the user interface 1202 is configured to send an authorization time limit to the server, where the authorization time limit represents an effective time limit for the server to perform authorization on access of the information requesting terminal to shared content.

Optionally, the processor 1201 is further configured to use the encryption algorithm to encrypt the received authentication identifier.

Figure 13:
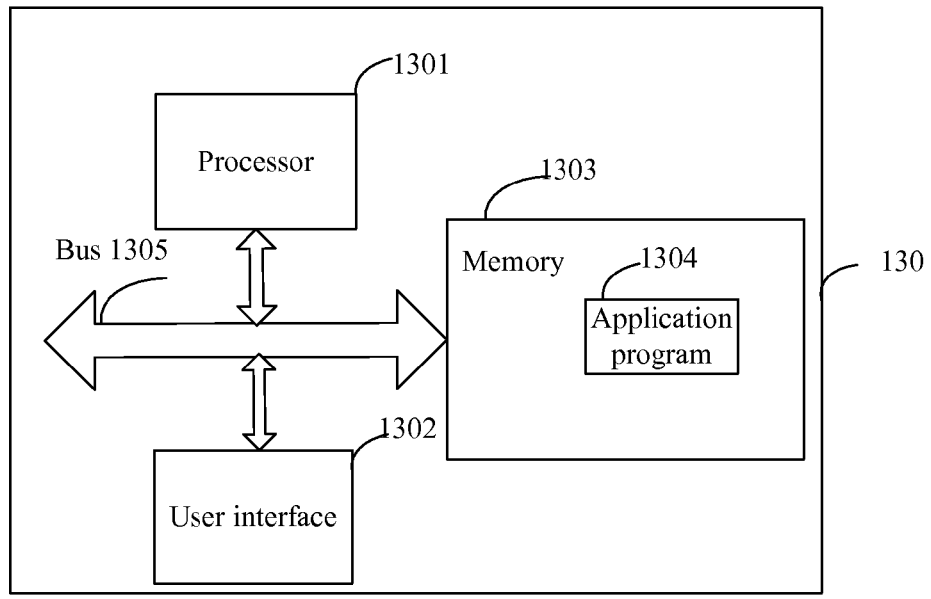
FIG. 13 is a schematic block diagram of a content sharing apparatus 130 according to another embodiment of the present invention.

FIG. 13 is a schematic block diagram of a content sharing apparatus 130 according to another embodiment of the present invention. As shown in FIG. 13, in order to enable an information management terminal to conveniently and securely authorize another person to access content that the information management terminal shares on a server, this embodiment provides a content sharing apparatus 130. As shown in FIG. 13, the content sharing apparatus 130 specifically includes a processor 1301, a user interface 1302, a memory 1303, an application program 1304, and a bus 1305.

The processor 1301 is configured to execute a program, which is stored by the memory 1303, of this embodiment of the present invention, and perform bidirectional communication with another apparatus by using the bus 1305.

The memory 1303 may include one or more of a computer floppy disk, a USB drive, a movable hard disk, a read-only memory (ROM, Read-Only Memory), a random access memory (RAM, Random Access Memory), a magnetic disk, an optical disc, or the like. The memory 1303 is configured to store a program capable of executing this embodiment of the present invention or an application database of this embodiment of the present invention, receive, by using the bus 1305, input of another component or stored information invoked by another component, for example, an instruction of querying a text information identifier, and querying a media information identifier, a text content identifier, and a keyword identifier.

The application program 1304 includes all types of system programs and is configured to implement all types of application services.

The user interface 1302 is open to a user, and is configured to connect to a terminal and perform data exchange.

The processor 1301 and the memory 1303 may also be integrated as a physical module applying this embodiment of the present invention. On the physical module, a program implementing this embodiment of the present invention is stored and run.

All components of the apparatus 130 are coupled together by using the bus 1305. In addition to a data bus, the bus 1305 may also include a power bus, a control bus, a status signal bus, and the like. However, for clear description, all buses are expressed as the bus 1305 in the figure.

In this embodiment of the present invention, each unit of the terminal 130 executes the following content respectively:

1302: The user interface is specifically configured to: receive an access request sent by an information requesting terminal, where the access request carries information about a shared resource that the information requesting terminal requests to access, periodically send a first authentication identifier to the information requesting terminal according to the received access request, and receive a second authentication identifier sent by an information management terminal.

The processor 1301 is configured to determine, according to the received second authentication identifier, whether the first authentication identifier sent to the information requesting terminal matches the second authentication identifier, and if the first authentication identifier sent to the information requesting terminal matches the second authentication identifier, determine access permission of the information requesting terminal.

Optionally, the processor 1301 is further configured to trigger, at regular time according to the received access request, the periodic sending of the first authentication identifier to the information requesting terminal.

Optionally, the processor 1301 is further configured to periodically send the first authentication identifier to the information requesting terminal according to the received access request and a preset time period.

Figure 14:
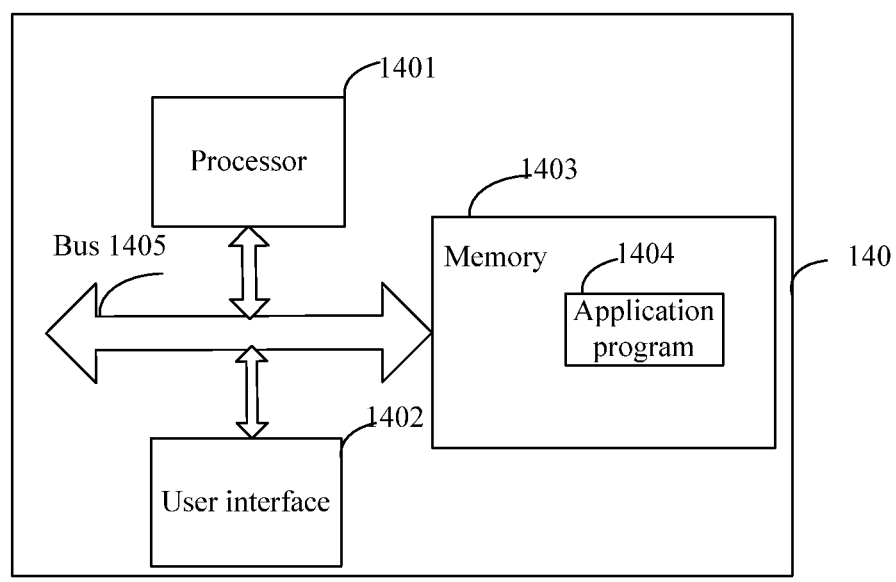
FIG. 14 is a schematic block diagram of a content sharing apparatus 140 according to another embodiment of the present invention.

FIG. 14 is a schematic block diagram of a content sharing apparatus 140 according to another embodiment of the present invention. As shown in FIG. 14, in order to enable an information management terminal to conveniently and securely authorize another person to access content that the information management terminal shares on a server, this embodiment provides a content sharing apparatus 140. As shown in FIG. 14, the content sharing apparatus 140 specifically includes a processor 1401, a user interface 1402, a memory 1403, an application program 1404, and a bus 1405.

The processor 1401 is configured to execute a program, which is stored by the memory 1403, of this embodiment of the present invention, and perform bidirectional communication with another apparatus by using the bus 1405.

The memory 1403 may include one or more of a computer floppy disk, a USB drive, a movable hard disk, a read-only memory (ROM, Read-Only Memory), a random access memory (RAM, Random Access Memory), a magnetic disk, an optical disc, or the like. The memory 1403 is configured to store a program capable of executing this embodiment of the present invention or an application database of this embodiment of the present invention, receive, by using the bus 1405, input of another component or stored information invoked by another component, for example, an instruction of querying a text information identifier, and querying a media information identifier, a text content identifier, and a keyword identifier.

The application program 1404 includes all types of system programs and is configured to implement all types of application services.

The user interface 1402 is open to a user, and is configured to connect to a terminal and perform data exchange.

The processor 1401 and the memory 1403 may also be integrated as a physical module applying this embodiment of the present invention. On the physical module, a program implementing this embodiment of the present invention is stored and run.

All components of the apparatus 140 are coupled together by using the bus 1405. In addition to a data bus, the bus 1405 may also include a power bus, a control bus, a status signal bus, and the like. However, for clear description, all buses are expressed as the bus 1405 in the figure.

In this embodiment of the present invention, each unit of the terminal 140 executes the following content:

1402: The user interface is specifically configured to: periodically send an authorization request to a server, where the authorization request is used for requesting the server to determine access permission of an information requesting terminal, receive a first authentication identifier sent by the server, and send the first authentication identifier to the information requesting terminal according to the received first authentication identifier.

Optionally, the processor 1401 is further configured to perform triggering at regular time, and the user interface 1402 is further configured to periodically send the authorization request to the server.

Optionally, the processor 1401 is further configured to set a preset time period, and the user interface 1402 is further configured to periodically send the authorization request to the server.

Optionally, the user interface 1402 may be further configured to monitor connection status of a communication connection by using a heartbeat mechanism.

Optionally, if the communication connection is disconnected, the user interface 1402 is configured to send a sharing termination instruction to the server, where the sharing termination instruction is used for enabling the server to terminate authorization for access performed by the information requesting terminal.

Optionally, the user interface 1402 is configured to negotiate an encryption algorithm with the server.

Optionally, the user interface 1402 is configured to send an authorization level to the server, where the authorization level represents permission for the information requesting terminal to perform an operation on shared content.

Optionally, the user interface 1402 is configured to send an authorization time limit to the server, where the authorization time limit represents an effective time limit for the server to perform authorization on access of the information requesting terminal to shared content.

Optionally, the processor 1401 is configured to use the encryption algorithm to encrypt the received authentication identifier.

In the embodiment of the content sharing apparatus provided in the present invention, an information management terminal and an information requesting terminal request a server to perform authentication on access permission of the information requesting terminal; and the server sends, by using a timer or by setting a preset time period, an authentication identifier for determining the access permission of the information requesting terminal. According to the technical solution provided in this embodiment of the present invention, a server periodically sends an authentication identifier to perform authentication on access permission of an information requesting terminal, which implements natural and secure privacy protection. Meanwhile, an information management terminal is only responsible for performing authorization and authentication on access to shared content. Actual shared content is directly sent from the server to the information requesting terminal and does not need to be forwarded by the information management terminal, which decreases traffic of the information management terminal and saves electric power.

A person of ordinary skill in the art may be aware that, in combination with the examples described in the embodiments disclosed in this specification, units, algorithm, and method steps may be implemented by a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing server and unit, reference may be made to a corresponding process in the foregoing method embodiments, and details are not described herein again.

In the several embodiments provided in the present application, the disclosed server and method may be implemented in other manners. For example, the described server embodiment is merely exemplary. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or a compact disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A content sharing method comprising:
receiving, by a server, an access request sent by an information requesting terminal, wherein the access request carries information about a shared resource that the information requesting terminal is requesting to access, and wherein the information about the shared resource is available from an information management terminal:

sending, by the server, a first authentication identifier to the information requesting terminal, wherein the information requesting terminal sends the first authentication identifier to the information management terminal according to the received first authentication identifier;

receiving, by the server, a second authentication identifier from the information management terminal;

determining, by the server, whether the first authentication identifier matches the second authentication identifier; and granting, by the server, access permission to the information requesting terminal when the first authentication identifier matches the second authentication identifier;

wherein the information management terminal is adapted to monitor a connection status of the information management terminal and the information requesting terminal using a heartbeat mechanism, and wherein the method further comprises:

receiving, by the server, a sharing termination instruction from the information management terminal when the information management terminal detects that a communication connection has been disconnected, wherein the sharing termination instruction prompts the server to terminate authorization access of the information requesting terminal;

wherein sending the first authentication identifier comprises periodically sending the first authentication identifier in response to the access request.

2. The method according to claim 1, wherein the first authentication identifier is sent periodically by the server upon the server being triggered by a timer.

3. The method according to claim 1, wherein the first authentication identifier is sent periodically by the server according to a preset time period.

4. The method according to claim 1, wherein the information about the shared resource further comprises an identifier for locating the shared content, a list of authorized resources, and an authorization level.

5. An authorization method comprising:

periodically sending, by an information management terminal, an authorization request to a server, wherein the authorization request requests that the server determine access permission of an information requesting terminal;

receiving, by the information management terminal, a first authentication identifier from the server;

sending, by the information management terminal, the first authentication identifier to the information requesting terminal; and sending, by the information management terminal, a second authentication identifier to the server, wherein the server is adapted to grant access permission to the information requesting terminal when the first authentication identifier matches the second authentication identifier;

monitoring a connection status of the information management terminal and the information requesting terminal using a heartbeat mechanism; and sending, by the information management terminal, a sharing termination instruction to the server upon detecting that a communication connection has been disconnected, wherein the sharing termination instruction prompts the server to terminate authorization access of the information requesting terminal;

wherein sending the first authentication identifier comprises periodically sending the first authentication identifier in response to the access request.

6. The method according to claim 5, wherein the first authentication identifier is sent periodically by the information management terminal upon the information management terminal being triggered by a timer.

7. The method according to claim 5, wherein the first authentication identifier is sent periodically by the information management terminal according to a preset time period.

8. A content sharing apparatus comprising:

a processor; and a computer readable storage medium storing programming for execution by the processor, the programming including instructions to:

receive an access request sent by an information requesting terminal, wherein the access request carries information about a shared resource that the information requesting terminal is requesting to access, and wherein the information about the shared resource is available from an information management terminal;

send a first authentication identifier to the information requesting terminal according to the received access request, wherein the information requesting terminal sends the first authentication identifier to the information management terminal;

receive a second authentication identifier from the information management terminal;

determine whether the first authentication identifier matches the second authentication identifier; and grant access permission to the information requesting terminal when the first authentication identifier matches the second authentication identifier;

monitor a connection status of the information management terminal and the information requesting terminal using a heartbeat mechanism; and send, by the information management terminal, a sharing termination instruction to the server upon detecting that a communication connection has been disconnected, wherein the sharing termination instruction prompts the server to terminate authorization access of the information requesting terminal;

wherein sending the first authentication identifier comprises periodically sending the first authentication identifier in response to the access request.

9. The apparatus according to claim 8, wherein the apparatus further comprises a timer configured to trigger, at regular time according to the received access request, the periodic sending of the first authentication identifier to the information requesting terminal, and wherein the instructions to periodically send the first authentication identifier to the information requesting terminal include instructions to periodically send the first authentication identifier to the information requesting terminal according to the triggering by the timer.

10. The apparatus according to claim 8, wherein the instructions to periodically send the first authentication identifier to the information requesting terminal include instructions to:

set a preset time period; and periodically send the first authentication identifier to the information requesting terminal according to the preset time period.

11. An authorization apparatus comprising:
a processor; and
a computer readable storage medium storing programming for execution by the processor, the programming including instructions to:
periodically send an authorization request to a server, wherein the authorization request requests that the server determine access permission of an information requesting terminal;
receive a first authentication identifier from the server;
send the first authentication identifier to the information requesting terminal;
and send a second authentication identifier to the server, wherein the server is adapted to grant access permission to the information requesting terminal when the first authentication identifier matches the second authentication identifier;
monitor a connection status of an information management terminal and the information requesting terminal using a heartbeat mechanism; and
send, by the information management terminal, a sharing termination instruction to the server upon detecting that a communication connection has been disconnected, wherein the sharing termination instruction prompts the server to terminate authorization access of the information requesting terminal;
wherein sending the first authentication identifier comprises periodically sending the first authentication identifier in response to the access request.

12. The apparatus according to claim 11, wherein the apparatus further comprises a timer configured to trigger, at regular time according to the received access request, the periodic sending of the first authentication identifier to the server, and
wherein the instructions to periodically send the first authentication identifier to the server include instructions to periodically send the first authentication identifier to the server according to the triggering by the timer.

13. The apparatus according to claim 11, wherein the instructions to periodically send the first authentication identifier to server include instructions to:
set a preset time period; and
periodically send the first authentication identifier to the server according to the preset time period.

\* \* \* \* \*